United States Patent
Mock

(10) Patent No.: US 8,605,872 B2
(45) Date of Patent: *Dec. 10, 2013

(54) MUTING A VIDEOCONFERENCE USING TOUCH-BASED GESTURES

(75) Inventor: Wayne E. Mock, Round Rock, TX (US)

(73) Assignee: LifeSize Communications, Inc., Austin, TX (US)

(*) Notice: Subject to any disclaimer, the term of this patent is extended or adjusted under 35 U.S.C. 154(b) by 256 days.

This patent is subject to a terminal disclaimer.

(21) Appl. No.: 13/171,299

(22) Filed: Jun. 28, 2011

(65) Prior Publication Data

US 2013/0002800 A1      Jan. 3, 2013

(51) Int. Cl.
*H04M 11/00* (2006.01)

(52) U.S. Cl.
USPC ..................... 379/93.21; 348/14.03

(58) Field of Classification Search
USPC ................. 348/14.01, 14.03; 379/93.21, 158, 379/202.01
See application file for complete search history.

(56) References Cited

U.S. PATENT DOCUMENTS

| | | | |
|---|---|---|---|
| 5,327,161 A | 7/1994 | Logan et al. | |
| 5,543,590 A | 8/1996 | Gillespie et al. | |
| 5,543,591 A | 8/1996 | Gillespie et al. | |
| 5,764,218 A | 6/1998 | Della Bona et al. | |
| 5,764,281 A | 6/1998 | Seo | |
| 5,825,352 A | 10/1998 | Bisset et al. | |
| 5,844,415 A | 12/1998 | Gershenfeld et al. | |
| 5,880,411 A | 3/1999 | Gillespie et al. | |
| 5,880,717 A | 3/1999 | Chan et al. | |
| 5,914,610 A | 6/1999 | Gershenfeld et al. | |
| 5,936,412 A | 8/1999 | Gershenfeld et al. | |
| 5,943,043 A | 8/1999 | Furuhata et al. | |
| 6,020,916 A * | 2/2000 | Gerszberg et al. | 348/14.07 |
| 6,025,726 A | 2/2000 | Gershenfeld et al. | |
| 6,028,271 A | 2/2000 | Gillespie et al. | |
| 6,051,981 A | 4/2000 | Gershenfeld et al. | |
| 6,066,954 A | 5/2000 | Gershenfeld et al. | |
| 6,323,846 B1 | 11/2001 | Westerman et al. | |
| 6,380,931 B1 | 4/2002 | Gillespie et al. | |
| 6,396,523 B1 | 5/2002 | Segal et al. | |
| 6,414,671 B1 | 7/2002 | Gillespie et al. | |
| 6,610,936 B2 | 8/2003 | Gillespie et al. | |
| 6,639,584 B1 | 10/2003 | Li | |
| 6,750,852 B2 | 6/2004 | Gillespie et al. | |
| 6,856,259 B1 | 2/2005 | Sharp | |

(Continued)

OTHER PUBLICATIONS

Jefferson Y. Han, "Low-cost multi-touch sensing through frustrated total internal reflection," Proceedings of the 18th annual ACM symposium on User interface software and technology, Oct. 23-27, 2005, pp. 115-118.

*Primary Examiner* — Olisa Anwah

(74) *Attorney, Agent, or Firm* — Meyertons Hood Kivlin Kowert & Goetzel, P.C.; Jeffrey C. Hood; Joel L. Stevens

(57) ABSTRACT

Controlling a videoconference based on gestures received to a touch interface. A gesture may be received to a touch interface. In response to the gesture, a videoconference action may be performed. For example, a first gesture may be received to mute the videoconference and in response, the videoconference may be muted. As another example, a second gesture may be received to adjust the volume of the videoconference, and the volume may be correspondingly adjusted. Further, various gestures may be received for controlling one or more cameras in a videoconference, accessing settings in a videoconference, interacting with a presentation, etc.

25 Claims, 21 Drawing Sheets

(56) References Cited

U.S. PATENT DOCUMENTS

| | | |
|---|---|---|
| 6,888,536 B2 | 5/2005 | Westerman et al. |
| 6,933,929 B1 | 8/2005 | Novak |
| 7,030,860 B1 | 4/2006 | Hsu et al. |
| 7,030,861 B1 | 4/2006 | Westerman et al. |
| 7,046,230 B2 | 5/2006 | Zadesky et al. |
| 7,109,978 B2 | 9/2006 | Gillespie et al. |
| 7,180,506 B2 | 2/2007 | Lin et al. |
| 7,184,031 B2 | 2/2007 | Lin et al. |
| 7,190,356 B2 | 3/2007 | Lin et al. |
| 7,312,785 B2 | 12/2007 | Tsuk et al. |
| 7,333,092 B2 | 2/2008 | Zadesky et al. |
| RE40,153 E | 3/2008 | Westerman et al. |
| 7,339,580 B2 | 3/2008 | Westerman et al. |
| 7,348,967 B2 | 3/2008 | Zadesky et al. |
| 7,358,963 B2 | 4/2008 | Low et al. |
| 7,450,113 B2 | 11/2008 | Gillespie et al. |
| 7,469,381 B2 | 12/2008 | Ording |
| 7,479,949 B2 | 1/2009 | Jobs et al. |
| 7,495,659 B2 | 2/2009 | Marriott et al. |
| 7,499,040 B2 | 3/2009 | Zadesky et al. |
| 7,509,588 B2 | 3/2009 | Van Os et al. |
| 7,532,205 B2 | 5/2009 | Gillespie et al. |
| 7,564,449 B2 | 7/2009 | Layton et al. |
| 7,576,732 B2 | 8/2009 | Lii |
| 7,701,447 B2 | 4/2010 | Lii et al. |
| 7,719,523 B2 | 5/2010 | Hillis |
| 7,728,821 B2 | 6/2010 | Hillis et al. |
| 7,770,136 B2 | 8/2010 | Beeck et al. |
| 7,804,490 B2 | 9/2010 | Chien et al. |
| 7,880,720 B2 | 2/2011 | Hill et al. |
| 7,907,124 B2 | 3/2011 | Hillis et al. |
| 7,907,125 B2 | 3/2011 | Weiss et al. |
| 7,911,456 B2 | 3/2011 | Gillespie et al. |
| 2009/0239587 A1 | 9/2009 | Negron et al. |
| 2010/0188473 A1 | 7/2010 | King et al. |
| 2010/0251158 A1 | 9/2010 | Geppert et al. |
| 2010/0277337 A1 | 11/2010 | Brodersen et al. |
| 2011/0085016 A1 | 4/2011 | Kristiansen et al. |
| 2011/0234746 A1* | 9/2011 | Saleh et al. ............... 348/14.03 |
| 2012/0154509 A1* | 6/2012 | Erb ............................ 348/14.03 |

* cited by examiner

Showing video and voice calls connect. No status issues.

Showing a problem with H.323.

Showing a problem with the network connection.

MUTING A VIDEOCONFERENCE USING TOUCH-BASED GESTURES

FIELD OF THE INVENTION

The present invention relates generally to conferencing and, more specifically, to controlling a videoconference.

DESCRIPTION OF THE RELATED ART

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to one or more other (remote) participants. Each videoconferencing system may also include a display and speaker to reproduce video and audio received from remote participant(s). Each videoconferencing system may also be coupled to a computer system to allow additional functionality into the videoconference. For example, additional functionality may include data conferencing (including displaying and/or modifying a document for both participants during the conference).

Initial videoconferencing systems generally used a remote control to control videoconferencing functionality. However, as videoconferencing has become more prevalent, the number of desired and supported features has increased greatly. Unfortunately, the interfaces used to control videoconferences have not been able to keep up the increase in features, leading to a confusing and inefficient user interaction. Accordingly, improvements in videoconferencing control are desired.

SUMMARY OF THE INVENTION

Various embodiments are presented of a system and method for controlling a videoconference using a touch interface.

Initially, a first gesture may be received to the touch interface. The first gesture may be any of various types of gestures, but may generally be a complex gesture (one that involves more than a simple single touch tap gesture). Additionally, the first gesture may be received to the touch interface in any of various manners. For example, the touch interface may include a graphical user interface for controlling a videoconference or a videoconferencing system. The user may interact with the graphical user interface by performing a tap gesture to select various options displayed in the graphical user interface. In one embodiment, the first gesture may be performed over the graphical user interface and, e.g., may be independent from the various options presented in the graphical user interface, as described below.

In response to the first gesture, a first videoconference action may be performed. For example, the touch interface may receive the gesture in and then provide an indication of the gesture to the videoconferencing system (e.g., to a videoconferencing unit of the videoconferencing system).

The particular combination of gesture and videoconference action may be any desired combination. As discussed below, the gesture and action may relate to performing various volume control actions, muting, controlling a videoconference camera, and/or accessing settings (e.g., administrative settings for the videoconference or videoconferencing system), among other possibilities. Other pairings are envisioned and may be used for any desired videoconference action.

According to various embodiments, the first videoconference action may be determined based only on the first gesture itself. More specifically, the first videoconference action may be determined from the first gesture independent from a graphical user interface (or any information) displayed on the touch interface. For example, the graphical user interface may currently display options for presentations and the first gesture may be for muting the videoconference (although any other videoconference actions are possible). Accordingly, despite the context of the graphical user interface, the first gesture may perform the mute action. Thus, in this embodiment, the first videoconference action may be determined independent from the information displayed on the touch interface.

Alternatively, the first videoconference action may be based on the context of the first gesture. For example, the first gesture may be associated with a plurality of different actions and the method may determine which of the actions based on the context of the first gesture. Following the example above, the first gesture may be associated with a presentation (e.g., to move forward or back in a presentation) but may also be associated with a different action, e.g., controlling a camera. Accordingly, the method may determine that because a presentation is currently being given, because the current graphical user interface relates to presentations, etc. the first gesture is to perform the presentation action rather than the camera control action. The context may include whether the user input is received during a videoconference, whether the user input is received during a presentation, whether the user input is received during boot time or start up time of the videoconferencing system, a current graphical user interface (e.g., of the touch interface or of the videoconferencing display), a current menu being displayed (e.g., based on the subject of the menu, such as a presentation menu, in call menu, settings menu, participants menu, etc.), etc. Thus, in some embodiments, the videoconference action that is performed may be determined based on the context in which the first gesture was received.

Thus, in response to a gesture, a videoconference action may be performed.

BRIEF DESCRIPTION OF THE DRAWINGS

A better understanding of the present invention may be obtained when the following detailed description is considered in conjunction with the following drawings, in which.

Figure 1:
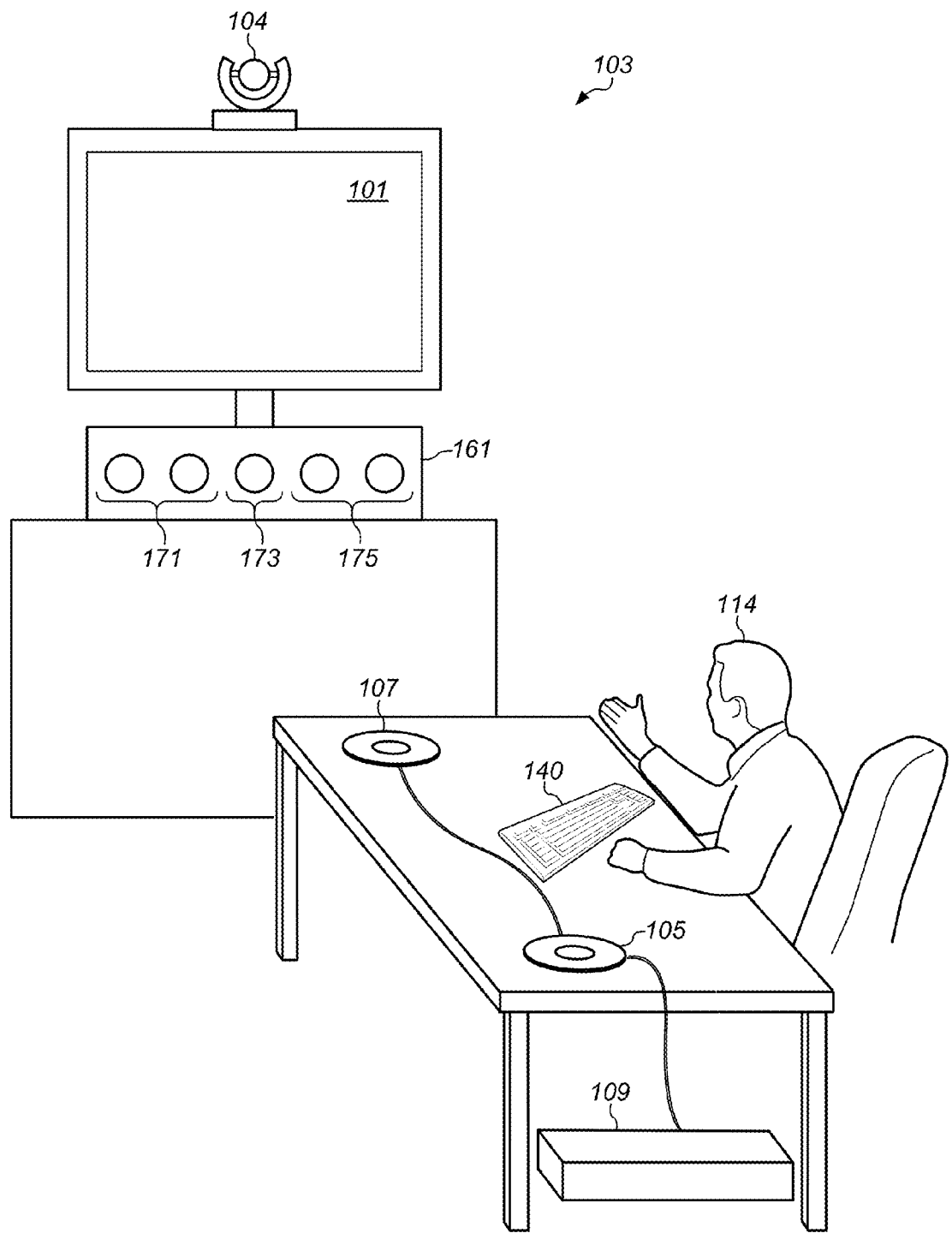
FIG. 1 illustrates an exemplary videoconferencing system participant location, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Virtual Decoders", Ser. No. 12/142,263, which was filed Jun. 19, 2008, whose inventors are Keith C. King and Wayne E. Mock, is hereby incorporated by reference in its entirety as though fully and completely set forth herein.

U.S. patent application titled "Video Conferencing Device which Performs Multi-way Conferencing", Ser. No. 12/142,340, whose inventors are Keith C. King and Wayne E. Mock, is hereby incorporated by reference in its entirety as though fully and completely set forth herein.

U.S. patent application titled "Conferencing System Utilizing a Mobile Communication Device as an Interface", Ser. No. 12/692,915, whose inventors are Keith C. King and Matthew K. Brandt, is hereby incorporated by reference in its entirety as though fully and completely set forth herein.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

FIG. 1—Exemplary Participant Locations

FIG. 1 illustrates an exemplary embodiment of a videoconferencing participant location, also referred to as a videoconferencing endpoint or videoconferencing system (or videoconferencing unit). The videoconferencing system 103 may have a system codec 109 to manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference. In some embodiments, images acquired by the camera 104 may be encoded and transmitted to a multipoint control unit (MCU), which then provides the encoded stream to other participant locations (or videoconferencing endpoints).

The participant location may further include one or more input devices, such as the computer keyboard 140. In some embodiments, the one or more input devices may be used for the videoconferencing system 103 and/or may be used for one or more other computer systems at the participant location, as desired.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to a system codec 109. The system codec 109 may be placed on a desk or on the floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system, or to an MCU for provision to other conferencing systems. The conferencing system may be controlled by a participant or user through various mechanisms, such as a touch interface described herein. The touch interface may be implemented as a remote control, as a portion of the speakerphones 107 and/or 105, and/or in any other desired manner. FIGS. 2 and 3 provide exemplary embodiments of such an interface.

In various embodiments, the codec 109 may implement a real time transmission protocol. In some embodiments, the codec 109 (which may be short for "compressor/decompressor" or "coder/decoder") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may utilize MPEG, Indeo™, and Cinepak™, among others.

In some embodiments, the videoconferencing system 103 may be designed to operate with normal display or high definition (HD) display capabilities. The videoconferencing system 103 may operate with network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system with a video camera, input devices, microphone and/or speakers). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference. The GUI may also present options for recording a current videoconference, and may also present options for viewing a previously recorded videoconference.

Note that the videoconferencing system shown in FIG. 1 may be modified to be an audioconferencing system. For example, the audioconference could be performed over a network, e.g., the Internet, using VoIP. The audioconferencing system, for example, may simply include speakerphones 105/107 and the touch interface described herein, although additional components may also be present. Additionally, note that any reference to a "conferencing system" or "conferencing systems" may refer to videoconferencing systems or audioconferencing systems (e.g., teleconferencing systems). In the embodiments described below, the conference is described as a videoconference, but note that the methods may be modified for utilization in an audioconference.

Figure 2A:
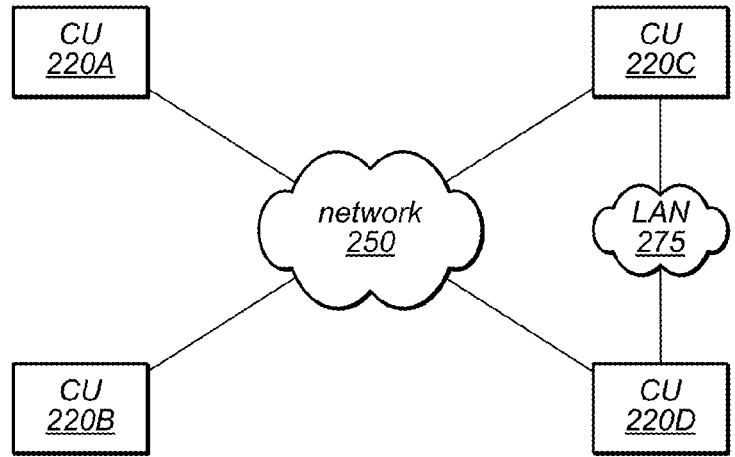
FIGS. 2A and 2B illustrate exemplary conferencing systems coupled in different configurations, according to some embodiments.
Figure 2B:
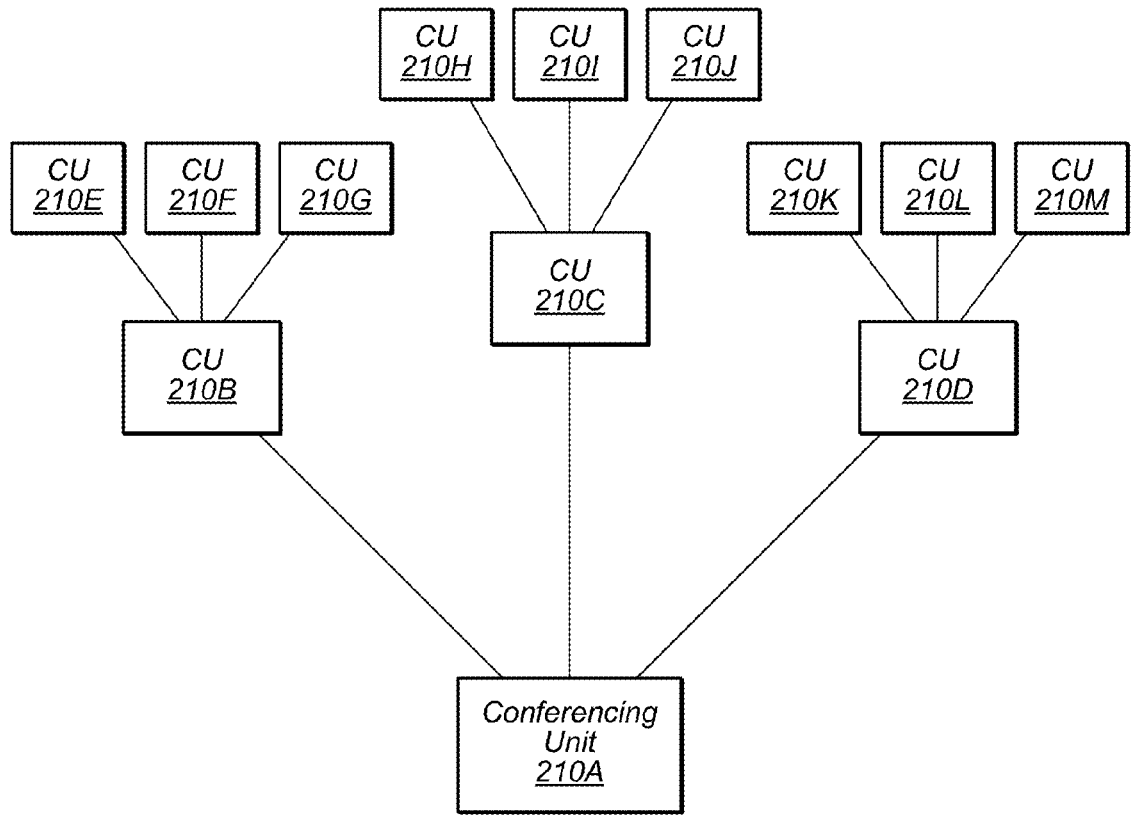

FIGS. 2A and 2B—Coupled Conferencing systems

FIGS. 2A and 2B illustrate different configurations of conferencing systems. The conferencing systems may be operable to perform the methods described herein. As shown in FIG. 2A, conferencing systems (CUs) 220A-D (e.g., videoconferencing systems 103 described above) may be connected via network 250 (e.g., a wide area network such as the Internet) and CU 220C and 220D may be coupled over a local area network (LAN) 275. The networks may be any type of network (e.g., wired or wireless) as desired.

FIG. 2B illustrates a relationship view of conferencing systems 210A-210M. As shown, conferencing system 210A may be aware of CU 210B-210D, each of which may be aware of further CU's (210E-210G, 210H-210J, and 210K-210M respectively). CU 210A may be operable to perform the methods described herein. In a similar manner, each of the other CUs shown in FIG. 2B, such as CU 210H, may be able to perform the methods described herein, as described in more detail below. Similar remarks apply to CUs 220A-D in FIG. 2A.

Figure 3A:
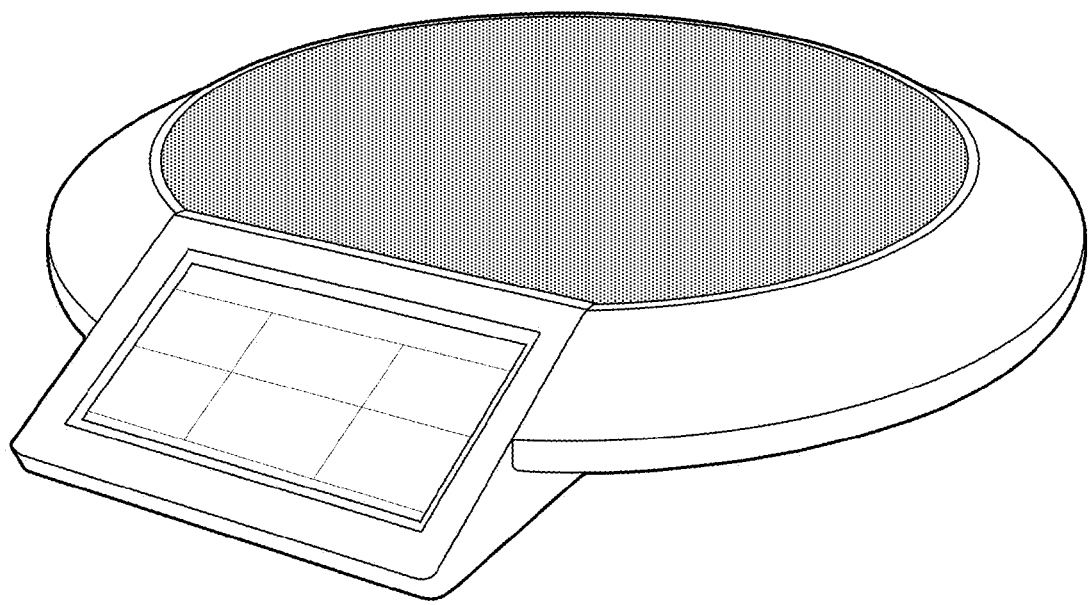
FIG. 3A illustrates an exemplary touch interface, according to one embodiment.
Figure 3B:
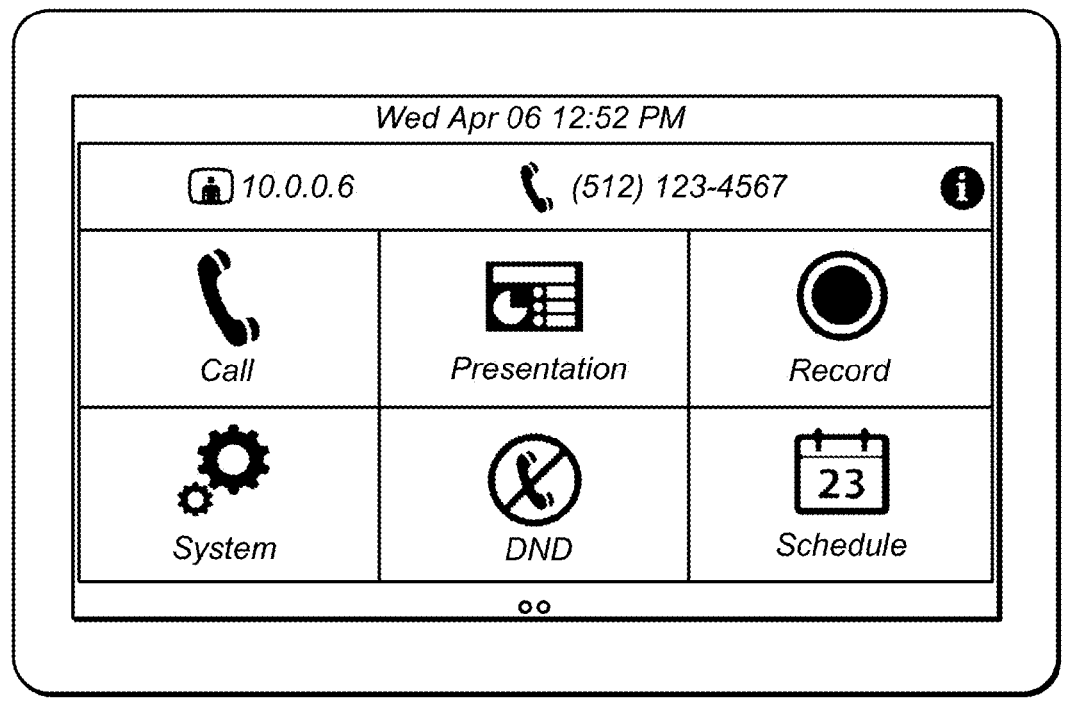
FIG. 3B illustrates an exemplary phone with a touch interface, according to one embodiment.

FIGS. 3A and 3B—Exemplary Touch Interface

FIG. 3A illustrates an exemplary touch interface and FIG. 3B illustrates an exemplary speaker phone with a touch interface. In the embodiment of FIG. 3A, the touch interface may be used as a remote control for a videoconferencing system, such as the videoconferencing system of FIG. 1. In the embodiment of FIG. 3B, the touch interface may be integrated in a phone, such as a speaker phone. In this embodiment, the touch interface may replace the typical physical button interface of the speaker phone, although additional physical buttons may also be present. Similarly, while the touch interface of FIG. 3A does not include physical buttons, embodiments are envisioned where physical buttons are also included. In some embodiments, the touch interface of FIG. 3B may be removable from the speaker phone (e.g., resulting in the touch interface of FIG. 3A), so that a user may separate the touch interface from the phone and use it as a remote control. The videoconferencing system of FIG. 1 may include a single touch interface (integrated in a speaker phone or not), or may include a plurality of touch interfaces (e.g., integrated with each of the speakerphones of the videoconferencing system). Additionally, the touch interface may be an explicit component of the videoconferencing system (e.g., as a speakerphone) or may be separate, but usable with the videoconferencing system. For example, a user's tablet or smart phone could be used as the (or one of the) touch interfaces of the videoconference.

In further embodiments, the touch interface (e.g., especially for the embodiment of FIG. 3B) may be usable outside of (or independently from) the videoconferencing system. For example, the touch interface may be used to perform audioconferencing without using all (or some of) the various additional components of the videoconferencing system. Thus, in one embodiment, the speaker phone of FIG. 3B may be used to perform audioconferencing.

As shown in these Figures, the touch interface may be a touch display that is configured to display graphics on the display as well as receive touch input. For example, as shown, the touch display may display a graphical user interface. For example, a user may be able to select various icons or graphical buttons displayed in the graphical user interface to perform videoconferencing actions.

A user may be able to provide gestures to the touch interface to perform videoconferencing actions. As used herein, a "gesture" refers to a touch interaction with a touch interface. A gesture may include the use of one finger (or digit), two fingers (e.g., to perform two simultaneous touches), three fingers, four fingers, five fingers, etc. A gesture involving one touch (e.g., by a single finger or digit) may be referred to as a "single-touch gesture" and a gesture involving more than one touch (e.g., by a plurality of fingers or digits) may be referred to as a "multi-touch gesture". Generally, a gesture is begun by initiating a touch and is ended when the touch is no longer present (e.g., when there is no longer any touch on the touch interface or when the initial touch is no longer on the touch interface).

Exemplary gestures include a single touch (e.g., a "tap" with a single finger), a double touch (e.g., a "double tap" with a single finger), a two finger touch (e.g., a "tap" using two fingers simultaneously), a three finger touch, a four finger touch, a five finger touch, an expansion gesture (e.g., a "reverse pinch" or "spread" where two touches are initiated and then the distance between the two touches are increased while both remain in contact with the touch interface, although more than two touches may be used, e.g., with three touches where at least one touch moves away from the other two touches), a minimization gesture (e.g., a "pinch" where two touches are initiated and then the distance between two touches are decreased while both remain in contact with the touch interface, although more than two touches are envisioned), a "drag" or "slide" gesture using one or more touches (e.g., where a single touch is initiated, then moved some distance along the touch interface, and then released), a "flick" gesture using one or more touches (e.g., where a touch is initiated and then quickly moved along the touch interface and released), a "press" gesture (e.g., where one or more touches are initiated and then held for a threshold amount of time, longer than a tap gesture), a "press and tap" gesture (e.g., where one or more touches are "pressed" and then a second one or more touches are "tapped"). In some embodiments, gestures may include drawing or outlining. For example, a user may provide a gesture by touching the touch interface and then drawing a shape (e.g., an "L", backwards "L", a circle, a square, or any type of shape or sequence of lines). The user may create the shape using any number of simultaneous touches (e.g., using one finger, using two fingers, etc.) and each may be distinguishable from the next based on the number of touches and drawn shape. Thus, gestures may include outlines or drawings of shapes. Generally, gestures described herein are more complex than simple single touch tap gestures. These gestures may be referred to as "complex gestures". Accordingly, as used herein, a "complex gesture" is any gesture other than (or more complex than) a single touch tap. Generally, a complex gesture includes a single touch and additional touch input (e.g., such as another touch for a two touch tap, additional movement for a drag, increased time for a "touch and hold" gesture, etc.). Additionally, any instance of a "gesture" used herein may refer to a "complex gesture".

In one embodiment, the gestures may be provided to a portion of the touch interface that is dedicated to gestures or may be provided in response to selecting a gestures button (e.g., in order to indicate to the touch interface that the user wishes to provide a gesture). However, in alternate embodiments, the gestures may be provided over the graphical interface. In such embodiments, the gestures may be used to indicate or perform a videoconferencing action that is not indicated in the graphical user interface. More specifically, the gestures may indicate the videoconferencing action independent from what is displayed on the touch display. In further embodiments, the touch interface may not include a display, and gestures may simply be provided to the touch interface.

Thus, a user may be able to interact with or control a videoconference using the touch interface of FIGS. 3A and 3B.

In further embodiments, the touch interface may provide features in addition to the controlling videoconference. For example, the touch interface may be used to display video of the videoconference (e.g., duplicating video that is displayed on the videoconferencing system's display or video that is not provided for display in the videoconferencing system). When displaying video, the touch interface may provide the video at a lower resolution and/or frame rate than the videoconference display(s) (e.g., which may operate at high definition). For example, the touch interface may display at a 5-10 frames per second (fps), although other frame rates are envisioned.

In one embodiment, the touch interface may be used to display a presentation while the videoconference display provides video of participants of the videoconference. For example, a user may be able to upload a presentation to the touch interface and then control the presentation via the touch interface. In another embodiment, a user may select to view a presentation provided by another user on the touch interface. Alternatively, the touch interface may be used to display video of participants, e.g., while a presentation is provided for display on the videoconference display(s). Any type of video may be provided for display on the touch interface, as desired.

Additionally, the touch interface (whether combined with the speaker phone as in FIG. 3B, or not, may be used as a mini videoconferencing system. For example, a user may be able to perform an audioconference using the speakerphone and then provide a presentation during the audioconference by using the touch interface, e.g., after using a USB thumb drive to upload the presentation to the touch interface. Thus, the touch interface may be configured to provide a video stream of the presentation to other participants, thereby acting as a videoconferencing system. Similarly, a camera may be used (e.g., integrated with the touch interface or speakerphone) and accordingly, the images captured by the camera may be provided to other participants of the videoconference. Thus, the touch interface may be used as a mini videoconferencing system in addition to acting as a component of the videoconferencing system, such as that shown in FIG. 1. Note that video may take a lower priority than audio in such an embodiment.

Figure 4:
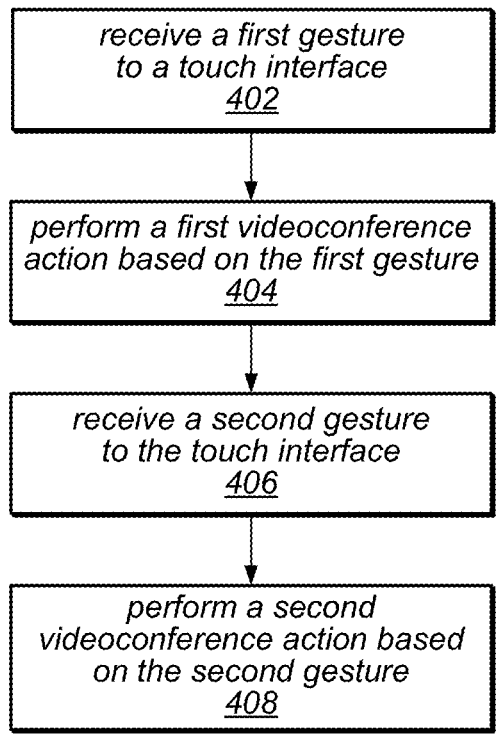
FIGS. 4-8 are flowchart diagrams illustrating embodiments of a method for controlling a videoconference using a touch interface.

FIG. 4—Controlling a Videoconference Using a Touch Interface

FIG. 4 illustrates a method for controlling a videoconference using a touch interface. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, a first gesture may be received to a touch interface. The first gesture may be any of the gestures described above, regarding FIGS. 3A and 3B, although any type of gesture is possible. Additionally, the first gesture may be received to the touch interface in any of various manners. For example, as indicated above, the touch interface may include a graphical user interface for controlling a videoconference. The user may interact with the graphical user interface by performing a tap gesture to select various options displayed in the graphical user interface. In one embodiment, the first gesture may be performed over the graphical user interface and, e.g., may be independent from the various options presented in the graphical user interface, as described below. Alternatively, the gesture may be provided within a "gesture" portion of the touch interface, in response to selecting a "provide gesture" option, etc. Further, the gesture may be interpreted based on the current options in the graphical user interface of the touch interface.

In 404, a first videoconference action may be performed in response to the first gesture. For example, the touch interface may receive the gesture in 402 and then provide an indication of the gesture to the videoconferencing system (e.g., to a videoconferencing unit of the videoconferencing system).

The particular combination of gesture and videoconference action may be any desired combination. As discussed below, the gesture and action may relate to performing various volume control actions, muting, controlling a videoconference camera, and/or accessing settings (e.g., administrative settings for the videoconference or videoconferencing system). Other pairings are envisioned and may be used for any desired videoconference action. For example, further videoconferencing actions that may be controlled include controlling the current slide in a presentation (e.g., a two finger swipe to move forward or backward in the presentation), adding or removing participants, changing layouts, promoting participants, answering calls, enabling or disabling do not disturb, selecting a new input, starting or stopping a presentation, getting help, performing call transfer, putting a call on hold, VoIP use or login (e.g., Skype® login or Presence Status Changes), interacting with remote systems, such as bridges or MCUs, etc.

The first videoconference action may be determined based only on the first gesture itself. More specifically, as indicated above, the first videoconference action may be determined from the first gesture independent from a graphical user interface (or any information) displayed on the touch interface. For example, the graphical user interface may currently display options for presentations and the first gesture may be for muting the videoconference (although any other videoconference actions are possible). Accordingly, despite the context of the graphical user interface, the first gesture may perform the mute action. Thus, in this embodiment, the first videoconference action may be determined independent from the information displayed on the touch interface.

Alternatively, the first videoconference action may be based on the context of the first gesture. For example, the first gesture may be associated with a plurality of different actions and the method may determine which of the actions based on the context of the first gesture. Following the example above, the first gesture may be associated with a presentation (e.g., to move forward or back in a presentation) but may also be associated with a different action, e.g., controlling a camera. Accordingly, the method may determine that because a presentation is currently being given, because the current graphical user interface relates to presentations, etc. the first gesture is to perform the presentation action rather than the camera control action. The context may include whether the user input is received during a videoconference, whether the user input is received during a presentation, whether the user input is received during boot time or start up time of the videoconferencing system, a current graphical user interface (e.g., of the touch interface or of the videoconferencing display), a current menu being displayed (e.g., based on the subject of the menu, such as a presentation menu, in call menu, settings menu, participants menu, etc.), layout selection, input selection, remote system interaction (e.g., for bridge or MCU), call statistics, call transfer, etc. Thus, in some embodiments, the videoconference action that is performed may be determined based on the context in which the first gesture was received.

In 406, a second gesture that is different from the first gesture may be received to a touch interface. Accordingly, in 408, a second, different videoconference action may be performed in response to the second gesture. The second gesture and second videoconferencing action may be received and performed in a manner similar to the first gesture in 402 and 404.

Exemplary gestures and actions are provided below in FIGS. 5-8. However, these are provided as examples only and other gestures and actions are envisioned. Additionally, the embodiments and variations described above apply to the gestures and actions of the following descriptions.

Figure 5:
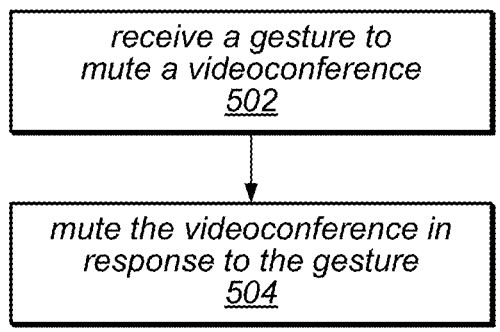

FIG. 5—Muting a Videoconference in Response to a Gesture

FIG. 5 illustrates a method for muting a videoconference using a touch interface. The method shown in FIG. 5 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 502, a gesture may be received to a touch interface to mute a videoconference. The gesture may be any desired gesture, e.g., from those described above, among other possibilities. For example, the gesture may be a two finger tap and/or a three finger tap, although other possibilities are envisioned.

In 504, the videoconference may be muted in response to the gesture. In some embodiments, the mute may be a "video mute" where the video provided from the participant location/videoconferencing system that received the input is no longer provided (or is provided as a blank or black screen). Alternatively, or additionally, the mute may be a "audio mute" where the audio provided from the participant location/videoconferencing system that received the input is no longer provided (or is otherwise silenced). In one embodiment, these two mutes may be separately controlled or activated using different gestures. For example, the audio mute may be invoked using a two finger tap and the video mute may be invoked using a three finger tap. Alternatively, or additionally, both mutes (or an "all mute" action) may be activated via a single gesture.

The audio mute and/or video mute may also mute the incoming audio or video from other participants. For example, when the audio mute is invoked, the audio from other participants may be silenced for the participant location/videoconferencing system that received the gesture. However, similar to above, the muting of incoming audio and/or video may be controlled via separate gesture(s) (e.g., one for each incoming mute or one for both, as desired).

Figure 6:
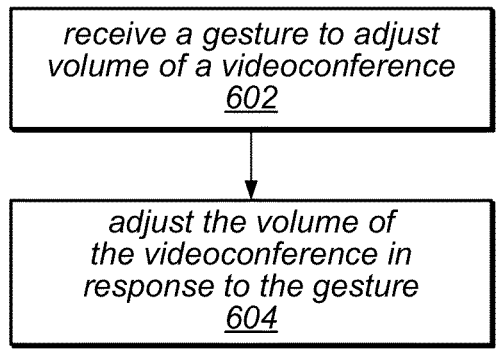

FIG. 6—Adjusting Volume of a Videoconference in Response to a Gesture

FIG. 6 illustrates a method for adjusting volume of a videoconference using a touch interface. The method shown in FIG. 6 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 602, a gesture may be received to a touch interface to mute a videoconference. The gesture may be any desired gesture, e.g., from those described above, among other possibilities. For example, the gesture may be a multi-touch vertical drag (e.g., touching with two touches and dragging vertically up or down and then releasing). However, other types of gestures are envisioned. For example, horizontal dragging gestures may be used.

In 604, the volume of the videoconference may be adjusted in response to the gesture. For example, the volume may be adjusted higher based on the gesture being an upward gesture. Similarly, the volume may be adjusted lower based on the gesture being a downward gesture.

The degree to which the volume is changed may be based on a characteristic of the gesture, such as the length or magnitude of the gesture. For example, smaller gestures may result in a smaller change in volume than larger gestures. Thus, a user providing a gesture which has a vertical length of 0.5" may have a smaller change in volume than one with a vertical length of 1".

As another example, the characteristic may be the length of time the gesture is held. For example, the user may provide an upward swipe with two touches, which may result in the increase of volume by a predetermined increment (likewise a downward swipe may result a decrease in volume by the predetermined increment). However, the user may elect to hold the gesture and the length of time may be used as the characteristic for determining the amount of change in volume. For example, the volume may increase or decrease an increment for every 0.25 seconds, 0.5 seconds, 1 second, etc. that the gesture is held (e.g., before release of the gesture). The determination of change in volume may be linear with respect to the characteristic of the gesture, exponential, geometric, or any desired mathematical relationship. Thus, as one example, the longer the length of the gesture or the longer the gesture is held (among other possible characteristics), the faster the volume may change.

Thus, in FIG. 6, volume for the videoconference may be modified based on a gesture received to a touch interface.

Figure 7:
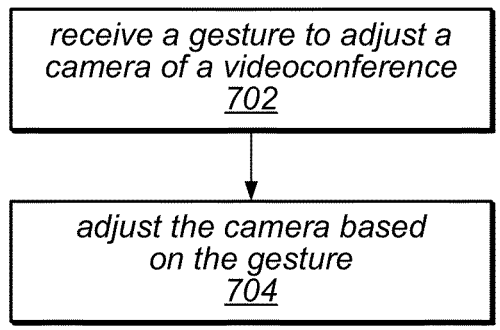

FIG. 7—Controlling a Camera of a Videoconference in Response to a Gesture

FIG. 7 illustrates a method for controlling a camera of a videoconference using a touch interface. The method shown in FIG. 7 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 702, a gesture may be received to control a camera of a videoconference. The gesture may be any desired gesture, e.g., from those described above, among other possibilities. For example, the gesture may include a drag gesture (e.g., with one or more touches) to direct the camera to change its position. As another example, the gesture may include a multi-touch gesture (e.g., a pinch or reverse-pinch gesture) to modify the zoom of the camera. As a further example, the gesture may include a multi-touch gesture (e.g., expanding or collapsing, using more than two fingers) to modify a focus of the camera. The gesture may be used to control any of various cameras, e.g., a local camera of the participant location, a far-end camera of another participant's location, etc. In some embodiments, different gestures may be used to control different cameras (e.g., where the number of touches indicates the desired camera, or where a pre-gesture indicates which camera the gesture applies to). Thus, a gesture may be received to control a camera.

In 704, a camera may be controlled in response to the gesture. As indicated above, in response to a drag gesture (e.g., using one or more touches), the camera may be correspondingly moved. For example, if the user provides a vertical drag gesture, the camera may move up or down in the same direction as the vertical drag (e.g., if the gesture was vertically up, then the camera may be tilted up). As another example, if the user provides a horizontal drag gesture, the camera may move left or right in the same direction as the horizontal drag. The gestures may not be limited to solely horizontal or vertical gestures—for example, an angled drag (e.g., from bottom left to top right) may result in an upward tilt and rightward pan, at the same time. In some embodiments, the camera movement may be the inverse of the provided movement (e.g., in response to the user enabling an "invert axis" option), where an upward drag results in a downward tilt. In some embodiments, the inversion may only be performed for the y-axis and not the x-axis, although other embodiments are envisioned (where both axis are inverted). Similar to the volume control embodiments discussed above, the degree of movement may be based on the size or magnitude of the drag, according to any of various mathematical relationships.

Figure 8:
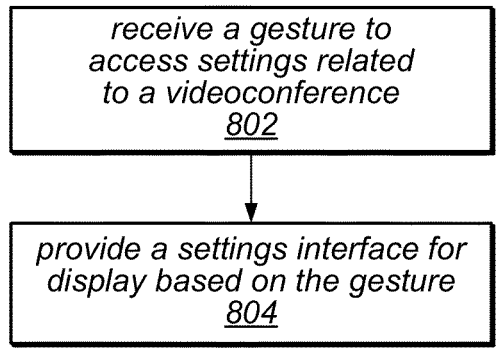

FIG. 8—Accessing Settings of a Videoconference in Response to a Gesture

FIG. 8 illustrates a method for muting a videoconference using a touch interface. The method shown in FIG. 8 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 802, a gesture may be received to a touch interface to access settings of the videoconference. The gesture may be any desired gesture, e.g., from those described above, among other possibilities. For example, the user may provide a large number of touch tap gesture (e.g., a four or five finger tap) to access the settings, although other types of gestures are envisioned In 804, a settings interface of a videoconference may be displayed in response to the gesture. For example, the settings interface may be for the current videoconference, for the videoconferencing system in general, or for any desired settings. The particular settings interface shown may be context dependent. For example, a same gesture may be used to invoke the settings interface, but the particular settings interface shown may depend on the context in which the gesture was received. For example, a settings interface of the videoconference may be displayed if a videoconference is in progress, a settings interface of the videoconferencing system may be displayed when a videoconference isn't in progress or as a default, a lower level (e.g., firmware) settings interface may be displayed if the gesture is provided during a boot or reboot, etc. Further, the gesture may be interpreted differently if it is provided in combination with other input. For example, the firmware settings may be displayed only when the gesture is provided during a reboot and a light sensor is flooded (e.g., using a flashlight). Thus, the settings interface may be context dependent. However, in alternate embodiments, different gestures may be used for each different settings interface. Additionally, after providing the gesture, the system may prompt the user for a password to access the settings interface.

The settings interface may be provided for display on the touch interface and/or on the display of the videoconference, as desired.

The settings gesture may be particularly beneficial so that the typical graphical user interface does not have to be cluttered with options that only administrators or IT professionals require. Additionally, the administrators may appreciate that users may not be aware of or may be unable to access (and therefore may be unable to modify) these settings, which may result in a more consistent and desirable operation of the videoconferencing equipment during videoconferences.

FIGS. 9A-20C—Exemplary Interfaces of a Touch Display

FIGS. 9A-20C are exemplary graphical user interfaces that may be provided on a touch display. These graphical user interfaces are provided only as an exemplary user interface and do not limit any of the embodiments described above.

Figure 9A:
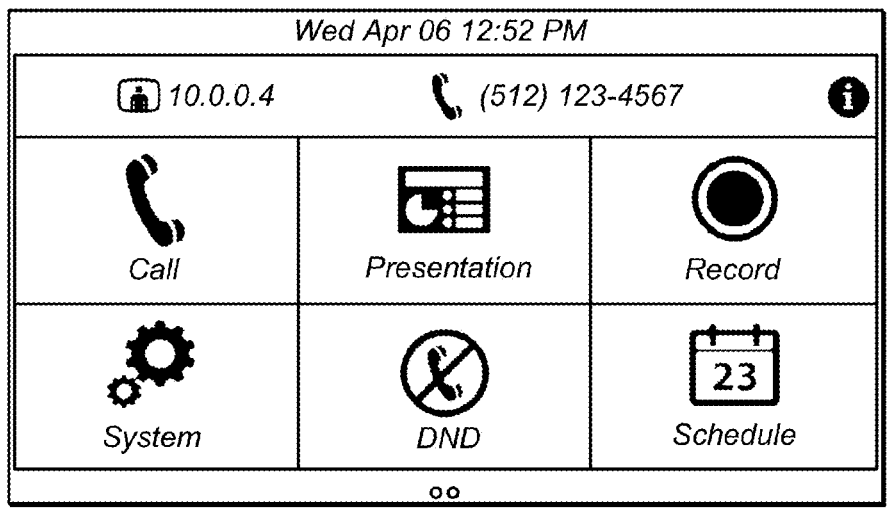
FIGS. 9A-20C illustrate exemplary interfaces for controlling the videoconference using the touch interface, according to one embodiment.
Figure 9B:
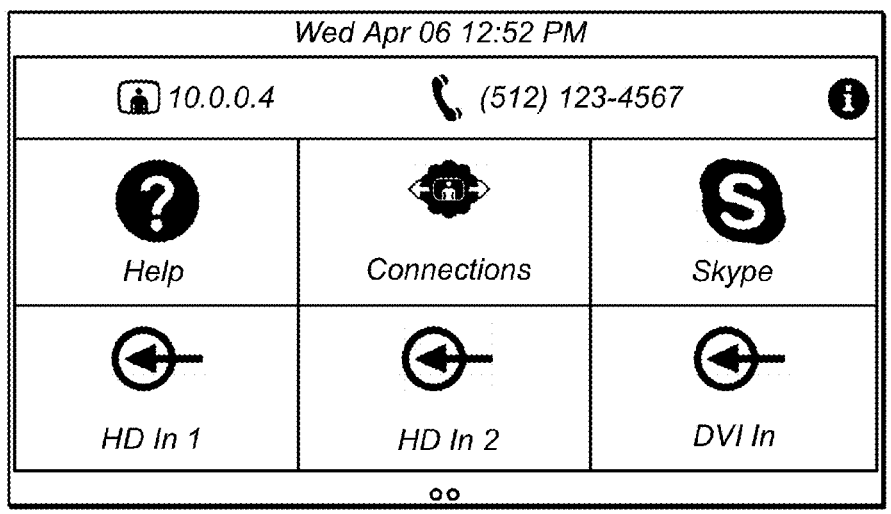
Figure 9C:
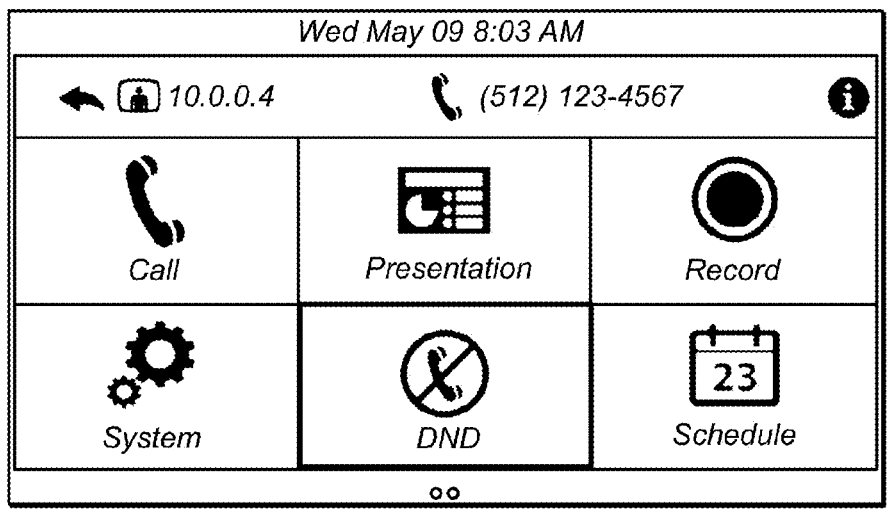

More specifically, FIGS. 9A and 9B illustrate various options in a home screen. More specifically, FIG. 9A illustrates an exemplary first set of options (or activities) for the home screen, including "call", "presentation", "record", "system", "Do Not Disturb", and "Schedule". FIG. 9B illustrates a second set of options, including "help", "connections", "Skype™", "HD In 1", "HD In 2", and "DVI In". FIG. 9C illustrates the home interface of 9A with the option "Do Not Disturb" selected. As shown, a DND icon is provided in the status bar.

Figure 10A:
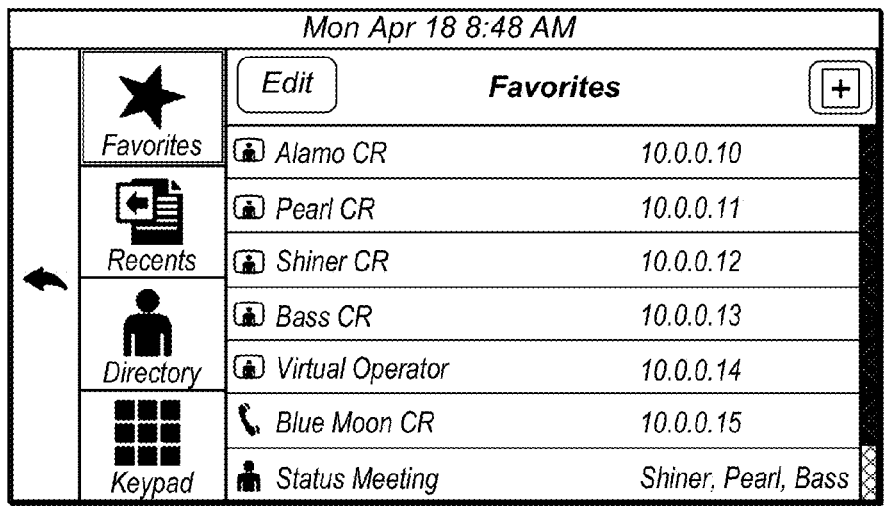

FIGS. 10A-10H illustrate exemplary interfaces associated with making calls, e.g., which may be presented after selecting the "call" option from FIG. 9A. As shown in FIG. 10A, a user may select from a set of entries within the "favorites" portion of the call interface. A user may tap an entry to perform a call for the selected videoconferencing system (or participant). The user may also select the edit button to perform editing, such as reordering the favorites list, deleting entries, etc. The user may also be able to select the add (or "+") button to add a new entry to the favorites list.

Figure 10B:
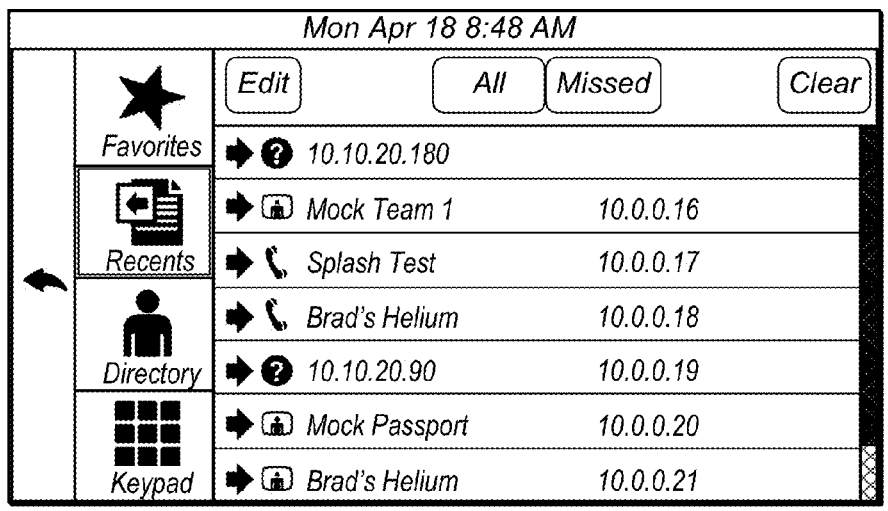

FIG. 10B illustrates a calling menu associated with recent calls (e.g., including recent calls made by the system, calls received from other systems, missed calls from other systems, etc.). In this interface, a user may be able to select an entry to perform a call, select an edit button to delete entries, select "all" to view all recent calls, select "missed" to filter for only missed calls, and select "clear" to clear all entries in the recent list.

Figure 10C:
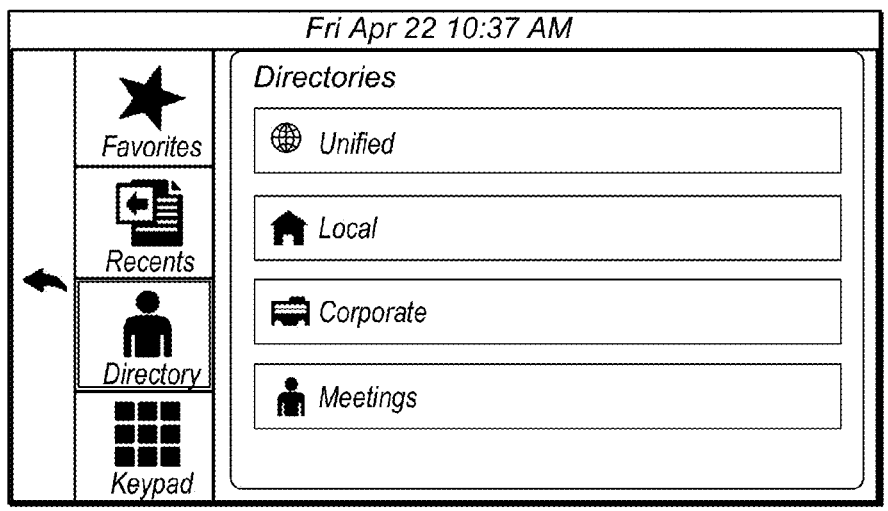
Figure 10D:
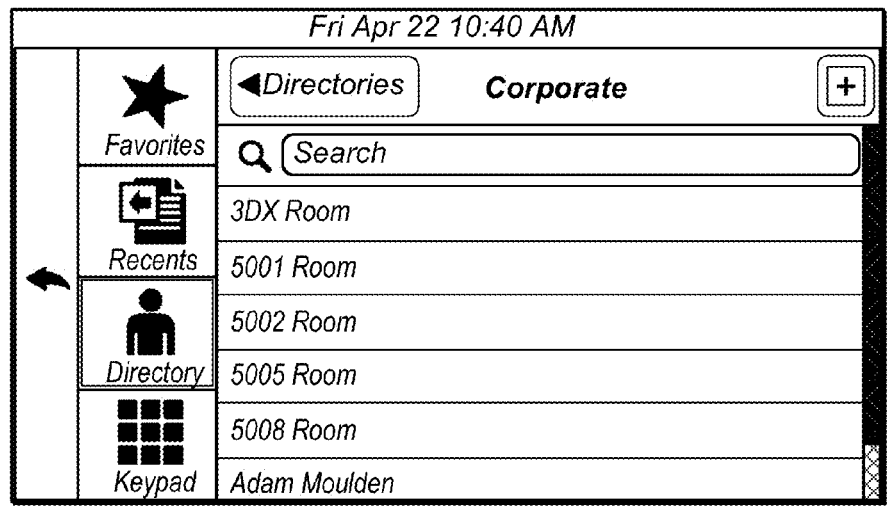
Figure 10E:
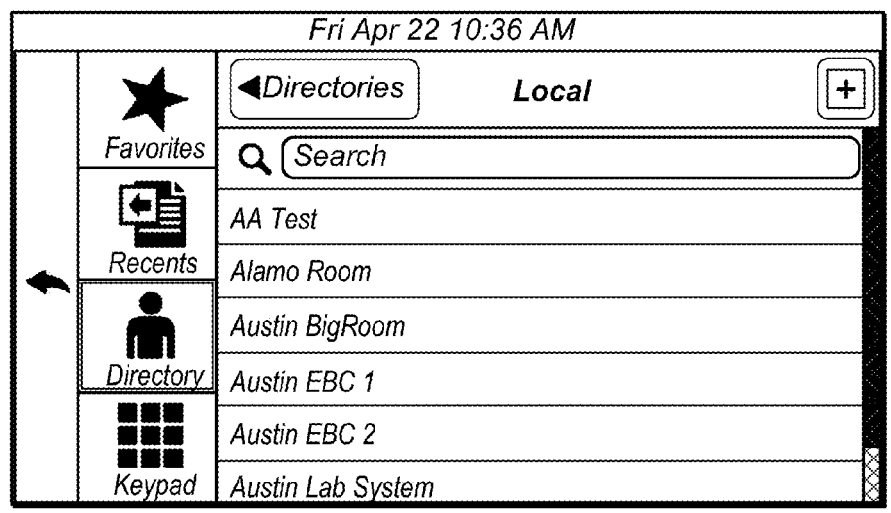

FIG. 10C illustrates an exemplary directory interface. As shown, a user may select from various different directories, including "unified" (e.g., showing all known conferencing systems), "local", "corporate", and "meetings". FIG. 10D illustrates the resulting interface after selecting the "local" directory. Thus, in the particular embodiment of FIG. 10D, the directory is for local systems (e.g., located within the same LAN). In one embodiment, selecting each entry may display the details of the entry, e.g., where a user can view, modify, or delete the entry. Alternatively, selecting an entry may perform a call to that entry. The user may also be able to select the "directories" button to view other directories (e.g., unified, local, corporate, meetings, etc.). The user may be able to select the "add" button to add an entry to the directory. Similar to FIG. 10D, 10E illustrates a corporate directory.

Figure 10F:
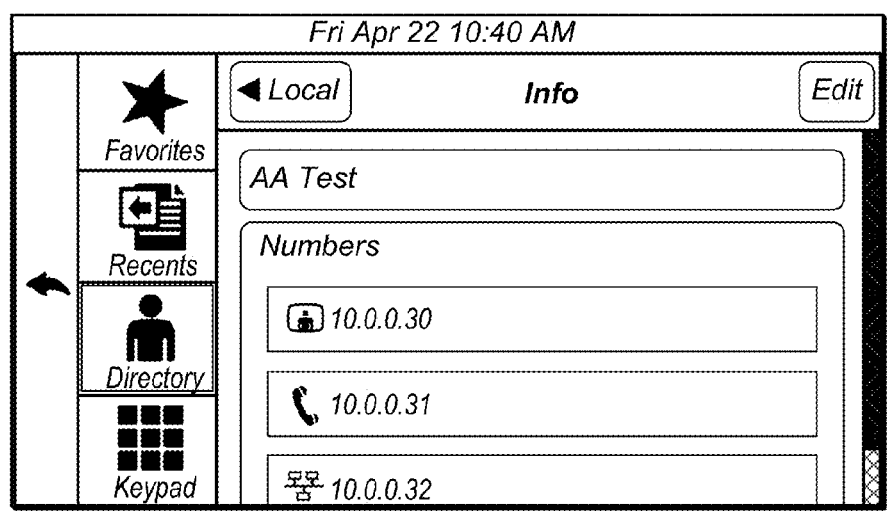

FIG. 10F illustrates an exemplary interface after selecting one of the conferencing systems from the directory. In this example, the user has selected "AA Test" and may select various modes of communication (e.g., audio, video, etc.) for initiating a conference.

Figure 10G:
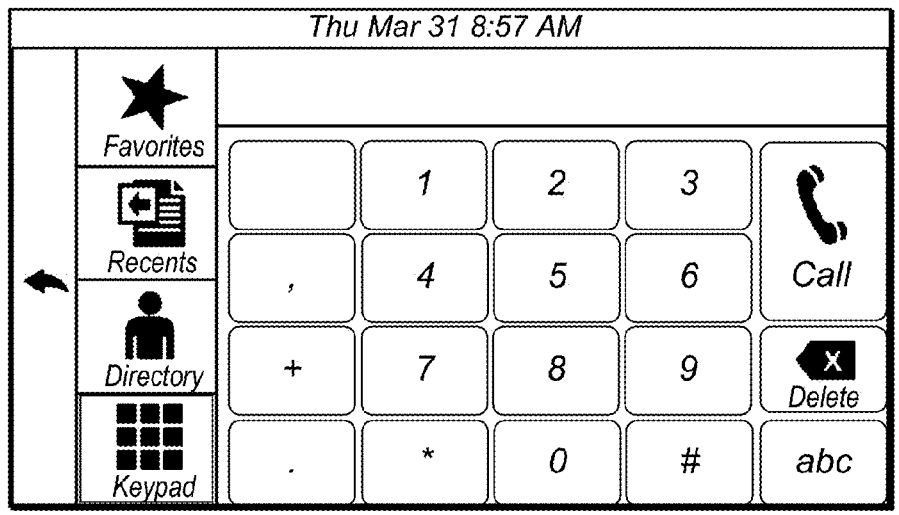
Figure 10H:
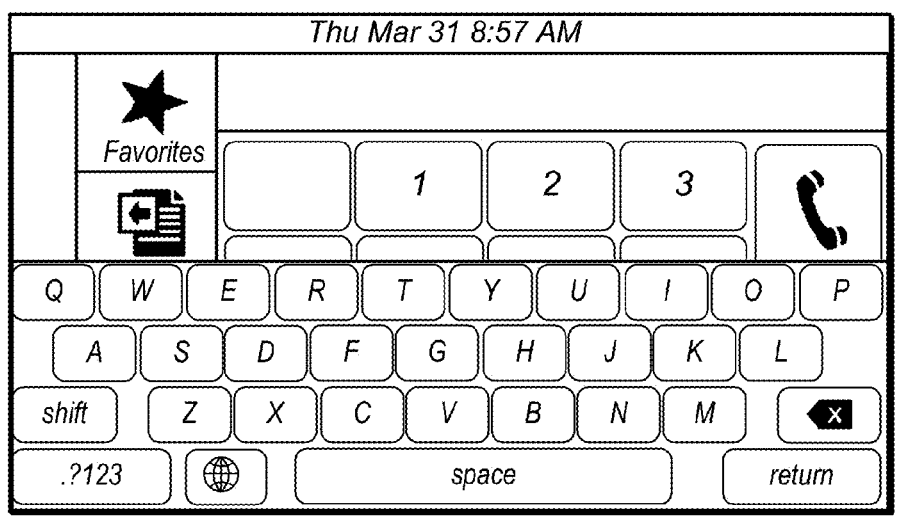

FIG. 10G illustrates an exemplary keypad interface for dialing a conferencing system. FIG. 10H illustrates an exemplary keyboard interface, e.g., for dialing a conferencing system.

Figure 11A:
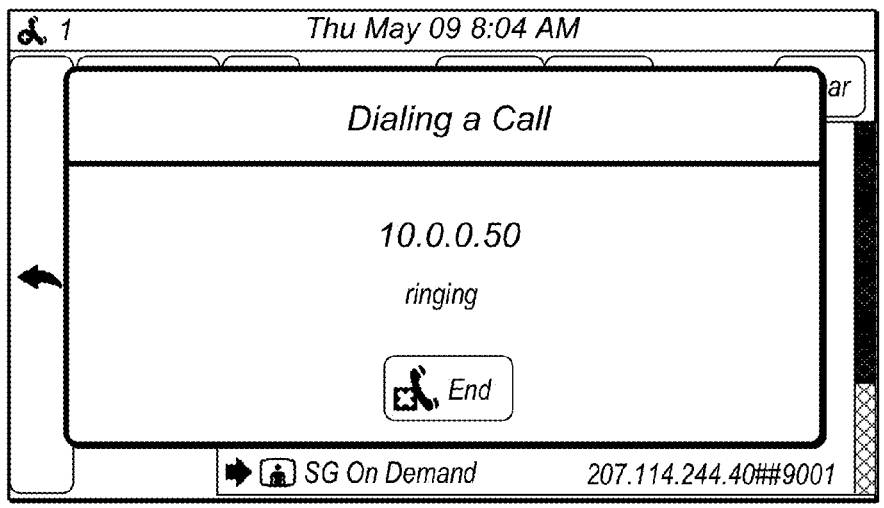
Figure 11B:
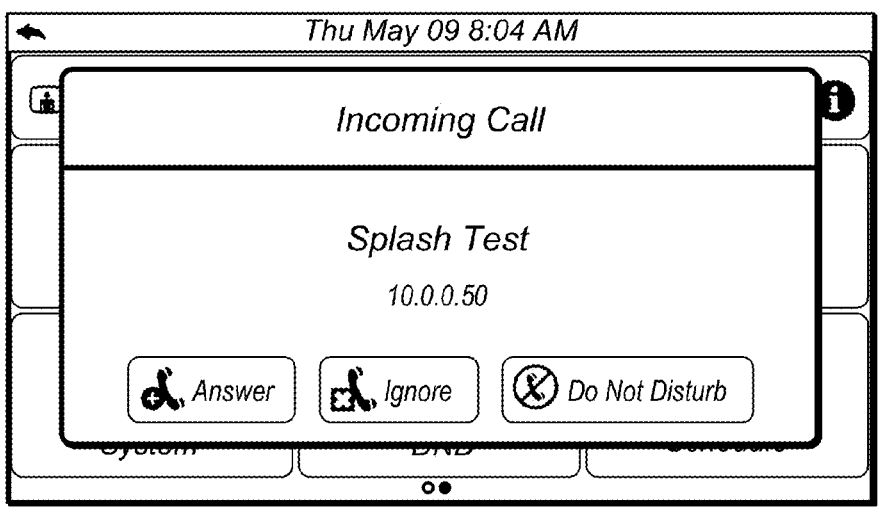
Figure 11C:
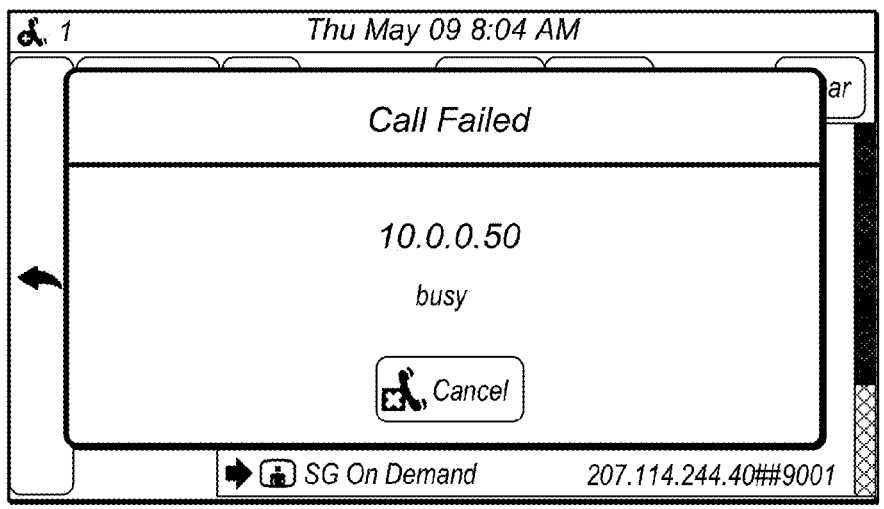

FIG. 11A illustrates an exemplary dialing screen that may be shown after a call is initiated. As shown, the interface may indicate the dialed address (in this case "10.10.20.123"), an option for ending the call, and the status ("ringing"). FIG. 11B illustrates an exemplary interface for an incoming call. As shown, the interface may indicate the identity of the incoming system, its address, and various options (e.g., "answer", "ignore", or "do not disturb"). FIG. 11C illustrates an interface when a call has failed. In this embodiment, the interface indicates the reason of failure ("busy") and presents the option to cancel the call (e.g., since it may automatically redial, although in other embodiments, the option may be to redial rather than to cancel).

Figure 12A:
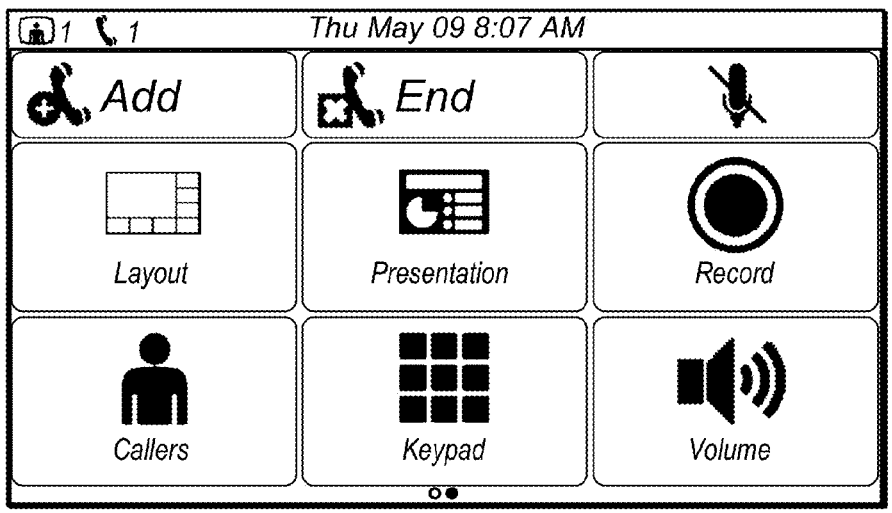
Figure 12B:
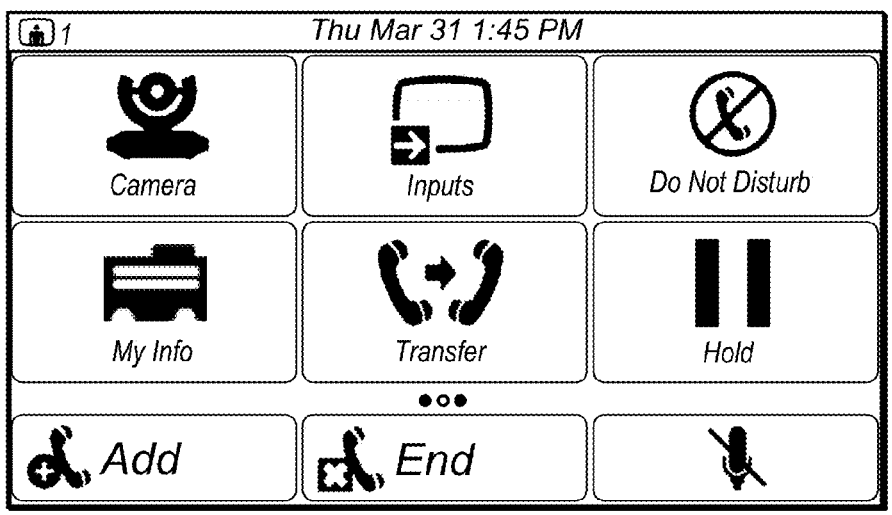
Figure 12C:
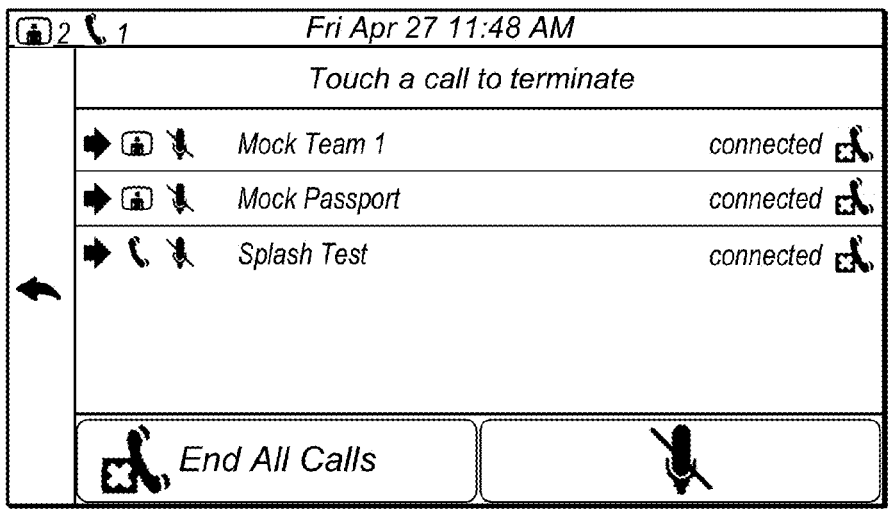
Figure 12D:
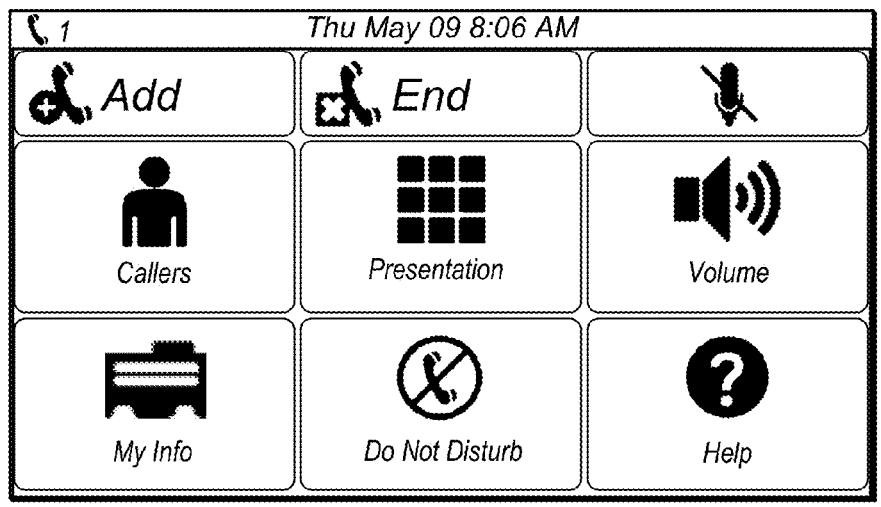
Figure 12E:
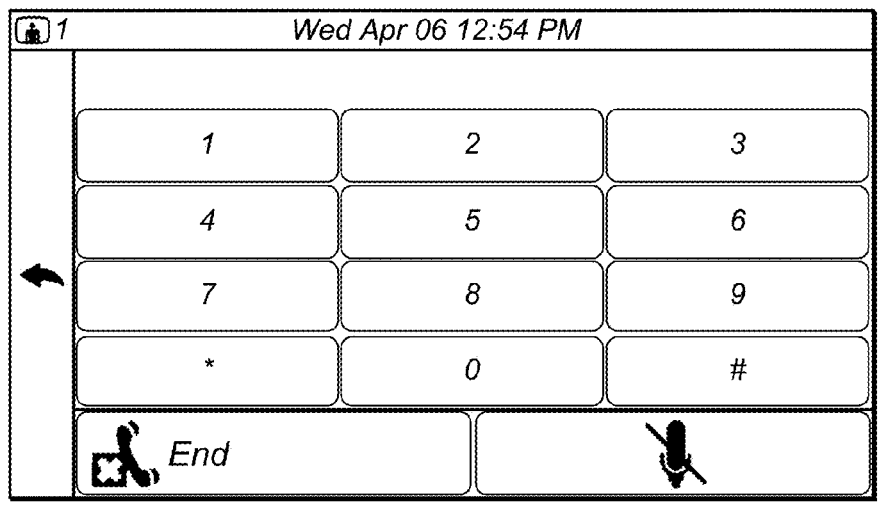
Figure 12F:
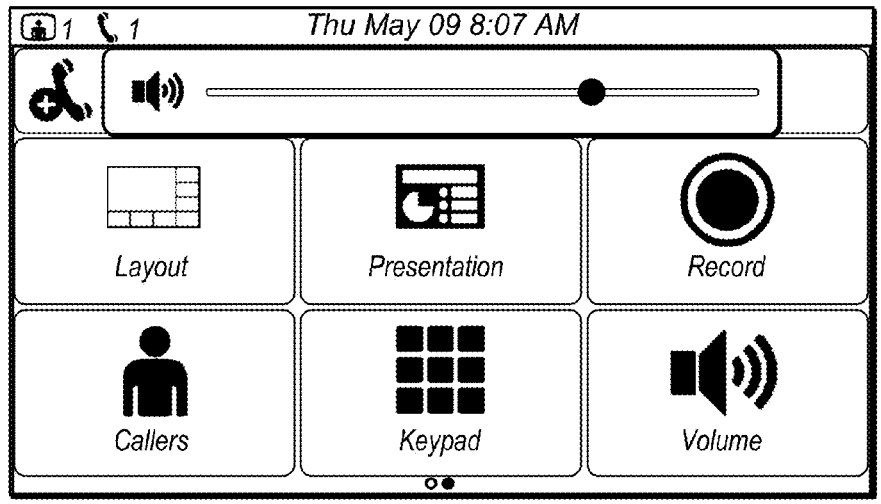

FIG. 12A illustrates an exemplary "in call" interface. As shown, a user may be able to add additional systems, end the call, mute the call, and access other options, such as "layout", "presentation", "record", "callers", "keypad", and "volume". As shown in FIG. 12B, the user may also be able to access a second page of options, e.g., by providing a swipe gesture, for "camera", "inputs", "Do Not Disturb", "My Info", "Transfer", "Hold". FIG. 12C illustrates an exemplary interface where a user may end or mute individual or all calls (e.g., connections to participants in the conference) in a conference. FIG. 12D illustrates an exemplary audio conferencing interface during a call. As shown, the user may add callers, end the call, mute the conference, select various options, such as "callers", "keypad", "volume", "my info", "do not disturb", and "help". FIG. 12E illustrates an exemplary keypad interface that may be used to interact with various touch tone systems, as desired. FIG. 12F illustrates an exemplary interface that indicates or allows the user to change the current volume of the conference.

Figure 13A:
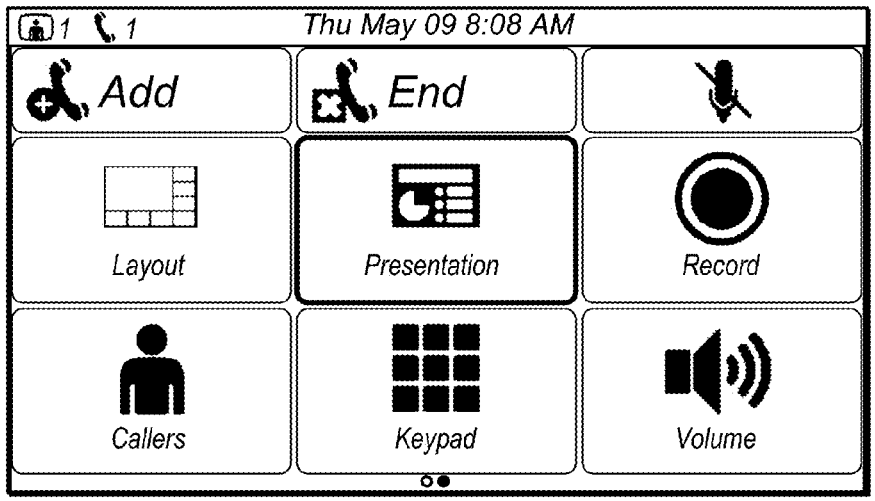
Figure 13B:
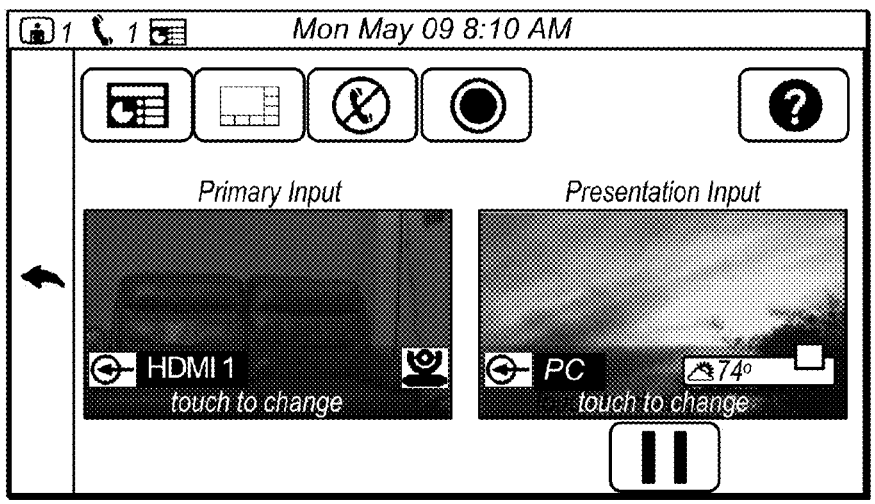
Figure 13C:
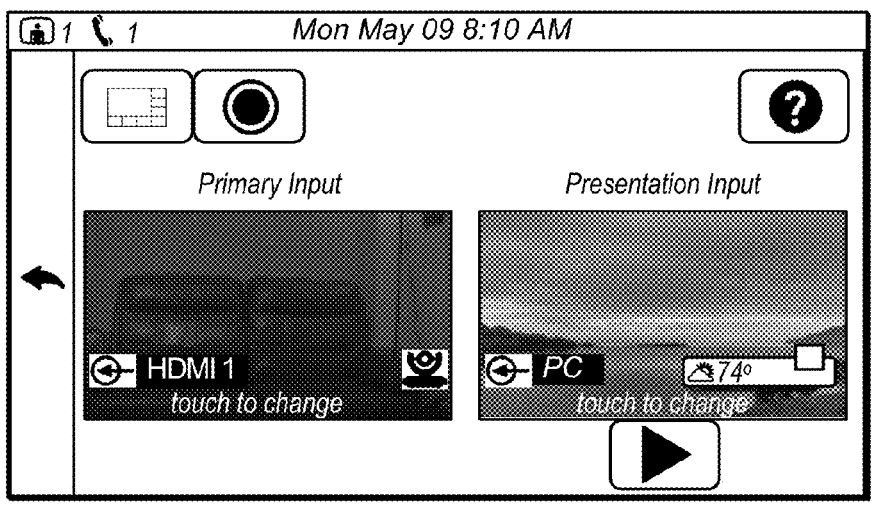

FIG. 13A illustrates an exemplary in call interface where the user has selected the "presentation" option during a call. FIG. 13B illustrates an interface during a presentation. In this case, the user is able to view both the PC input and the camera input. Additionally, the interface visually indicates the presentation/videoconference is being recorded, that the presentation is active in the videoconference, and the layout of the videoconference. FIG. 13C illustrates a similar interface, except indicating that the presentation is stopped.

Figure 14A:
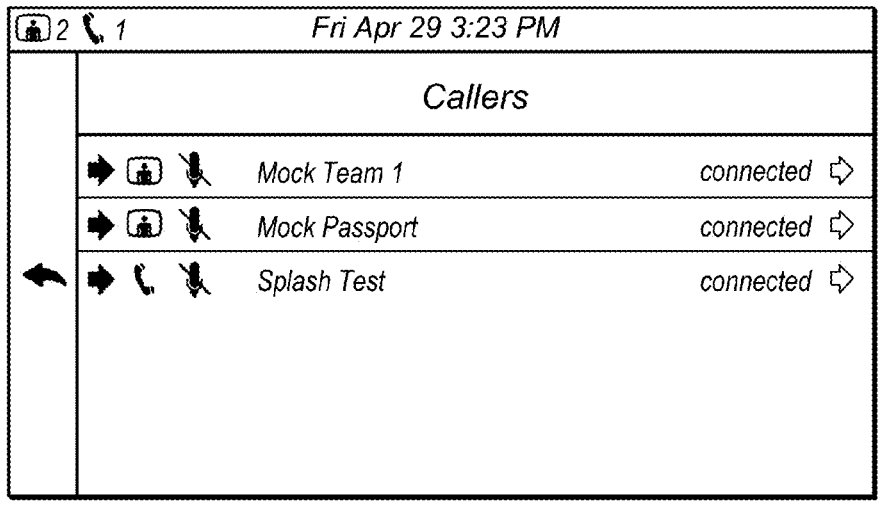
Figure 14B:
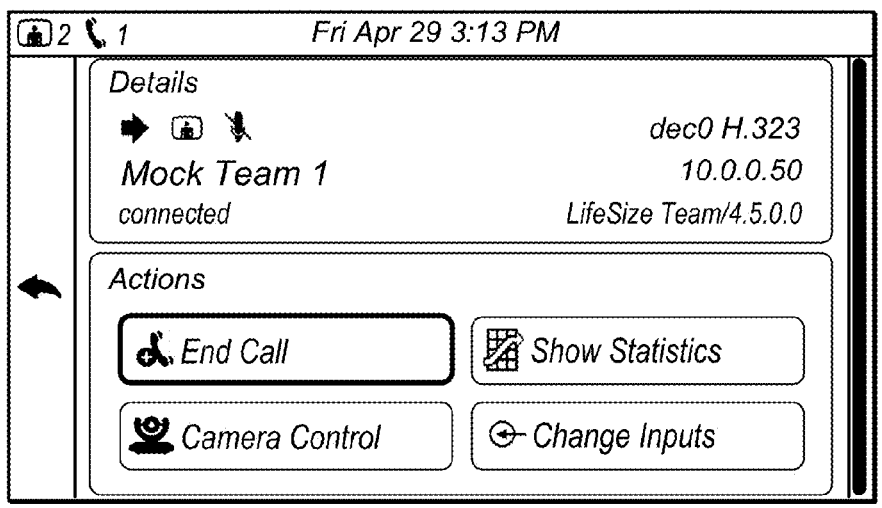
Figure 14C:
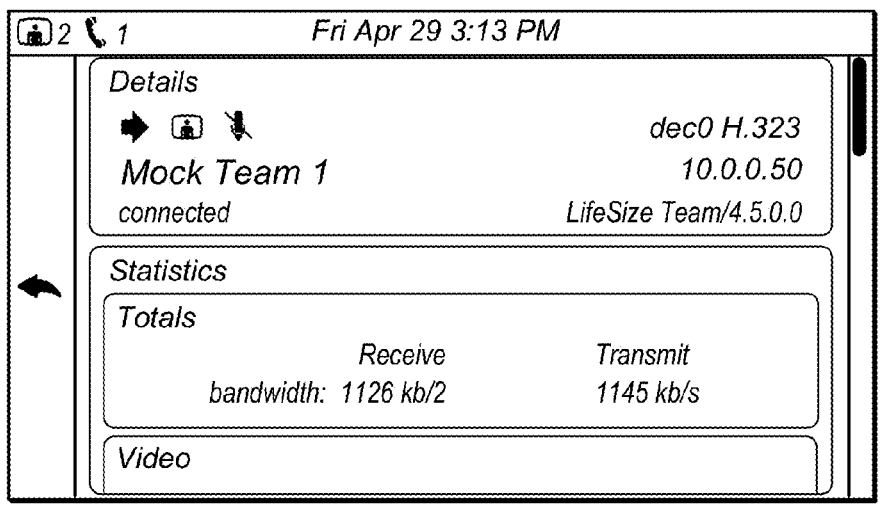
Figure 14D:
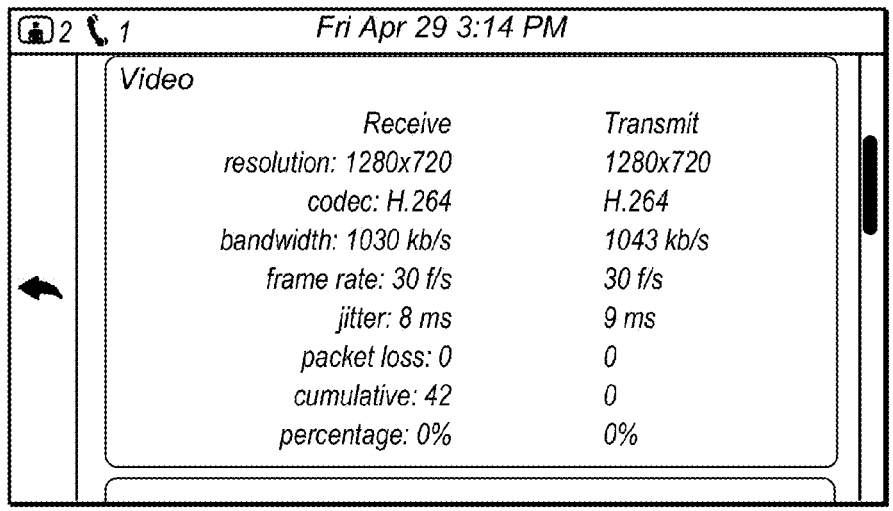
Figure 14E:
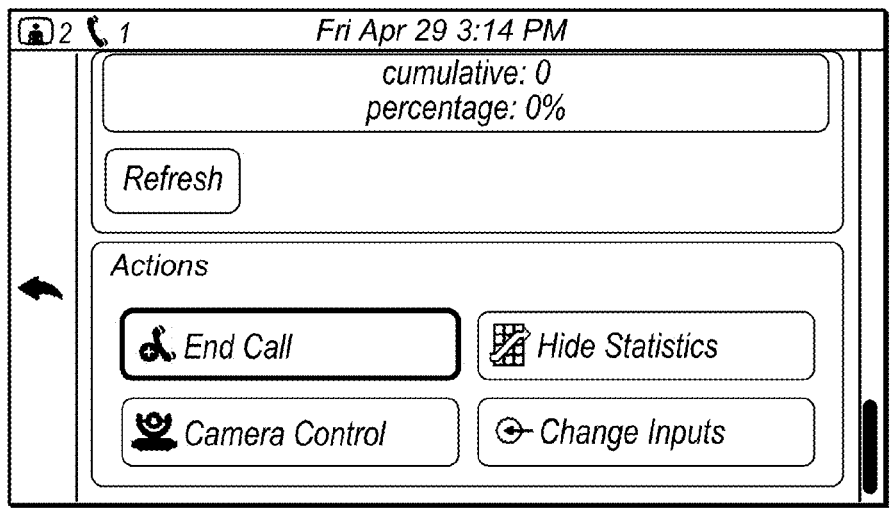

FIG. 14A illustrates a callers interface during a call. As shown, the interface may display the current participants or conferencing systems participating in the videoconference. A user may select any of these systems to view more information. For example, FIG. 14B illustrates further details for "Mock Team 1" as well as various options the user may select, such as "end call", "show statistics", "camera control", and "change inputs". FIGS. 14C-14E illustrate various statistics that may be viewed after selecting the "show statistics" option, such as receive and transmit bandwidth, resolutions, frame rate, jitter, packet loss, etc. In FIG. 14E the user may select similar options as those shown in FIG. 14A or may hide the statistics.

Figure 15A:
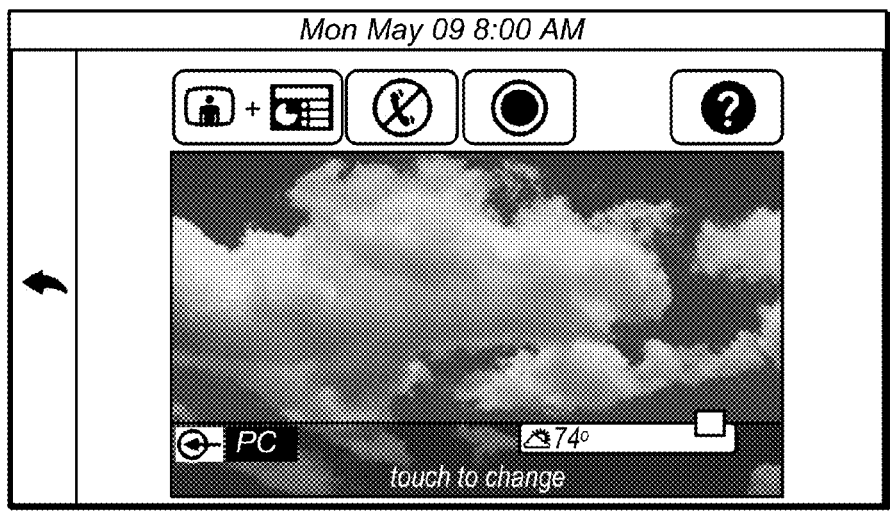
Figure 15B:
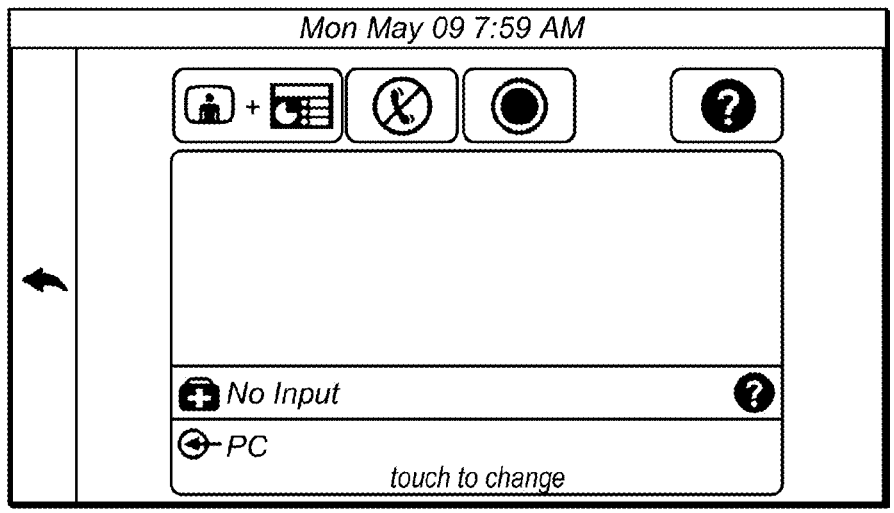
Figure 15C:
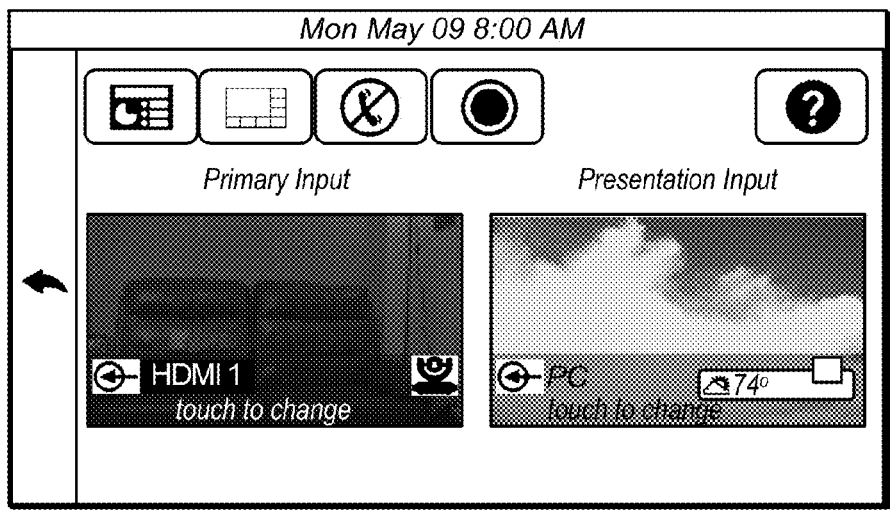
Figure 15D:
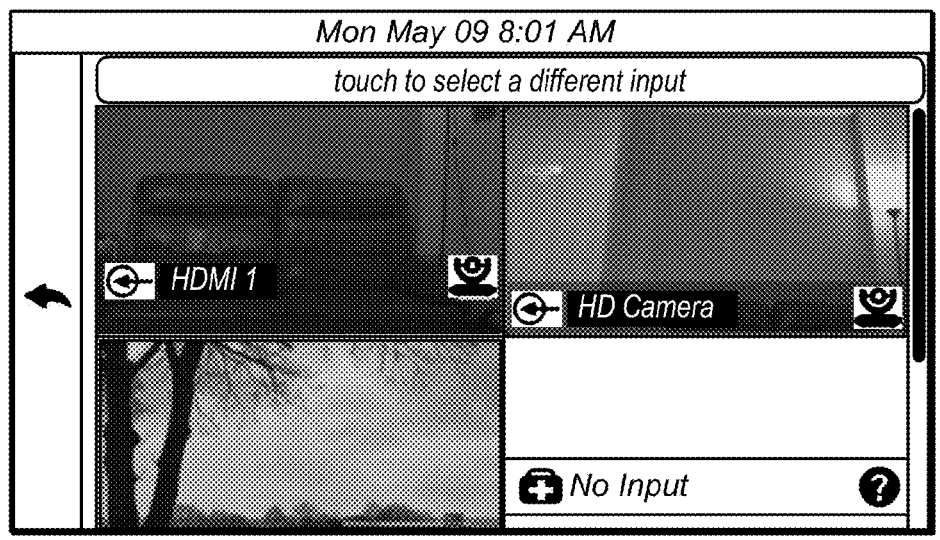
Figure 15E:
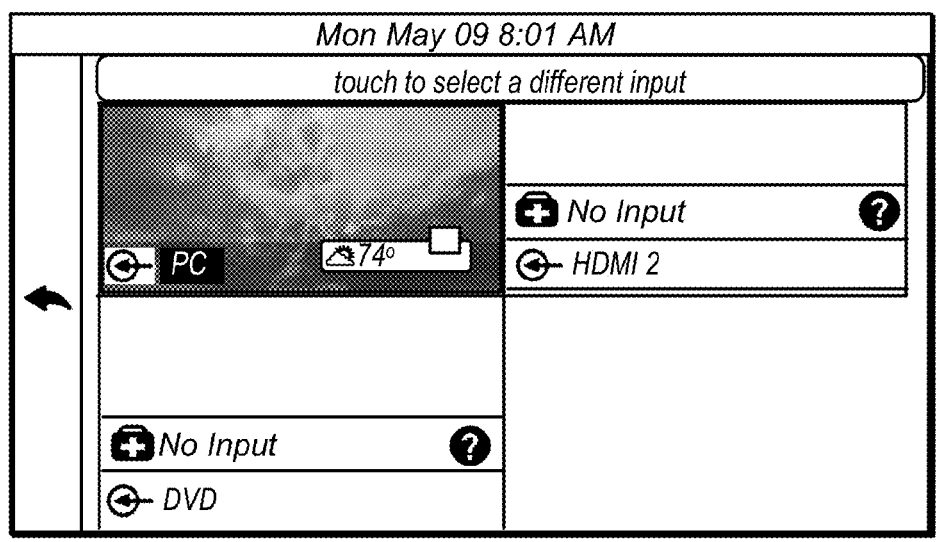

Turning back to the options of the home screen, FIG. 15A illustrates a single stream local presentations interface for an attached PC, which is being recorded with Do Not Disturb turned on. FIG. 15B illustrates a similar embodiment, except without an input. FIG. 15C illustrates a dual stream local presentation interface. Finally, FIGS. 15D and 15E illustrates exemplary input selection interfaces for selecting an input for the local presentation. These options may also be available for presentations during conferences, e.g., in conjunction to the interface of FIGS. 13A-13C.

Figure 16:
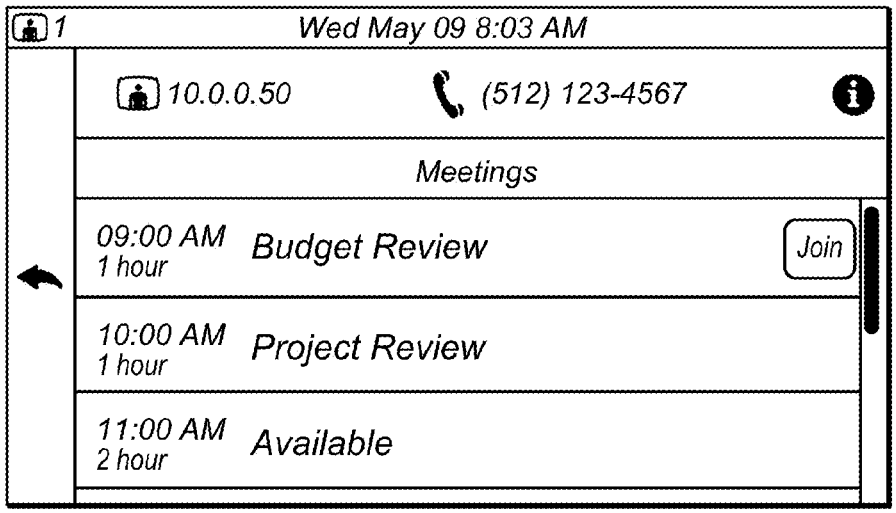
Figure 17:
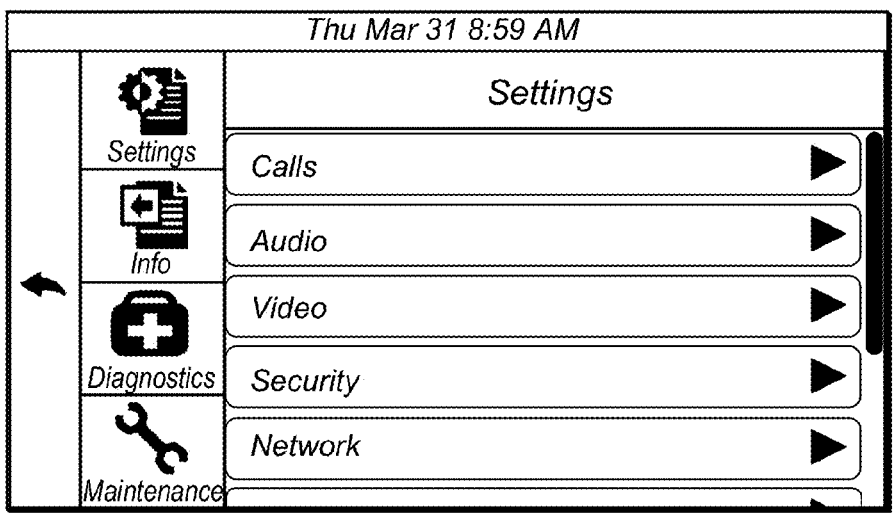
Figure 18:
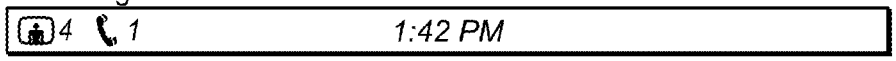
Figure 18:
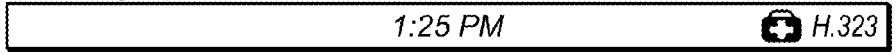
Figure 18:
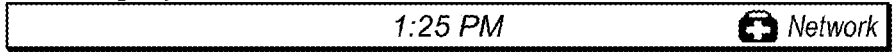

FIG. 16 illustrates an exemplary schedule interface showing scheduled conferences as well as information regarding the videoconferencing system. FIG. 17 illustrates an exemplary system settings interface, providing sub-interfaces for "settings", "info", "diagnostics", "maintenance", etc. FIG. 18 illustrates exemplary status bars for different statuses including a 4 video connection, 1 voice connection with no issues, a problem with H.323, and a problem with the network connection.

Figure 19A:
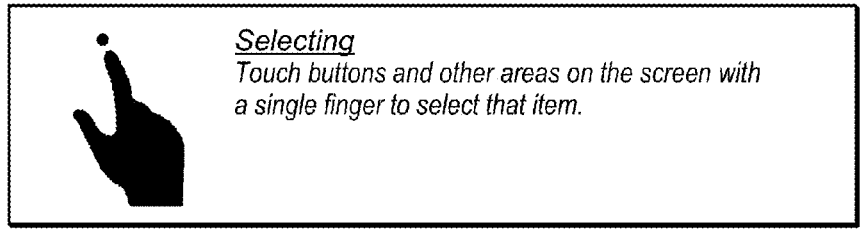
Figure 19B:
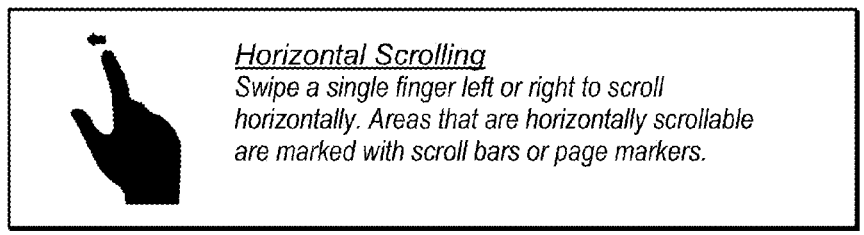
Figure 19C:
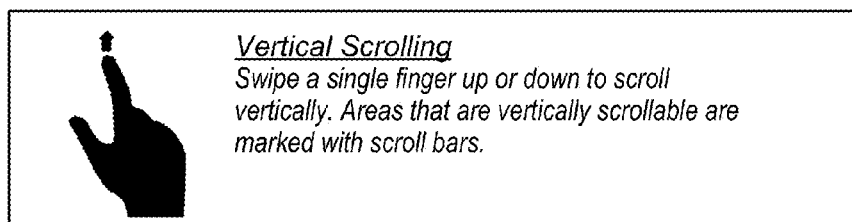
Figure 19D:
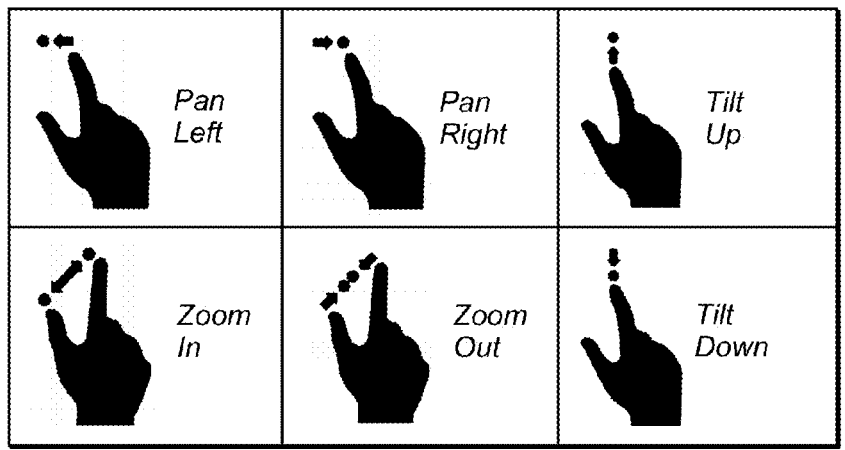
Figure 19E:
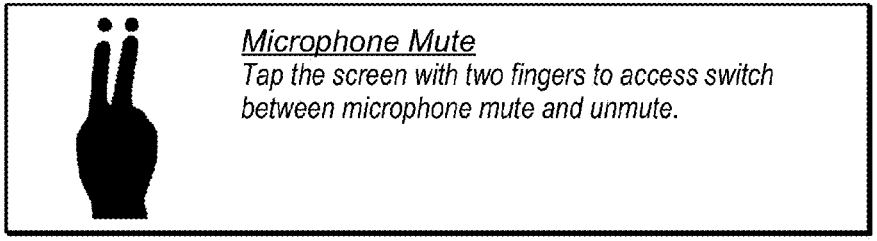
Figure 19F:
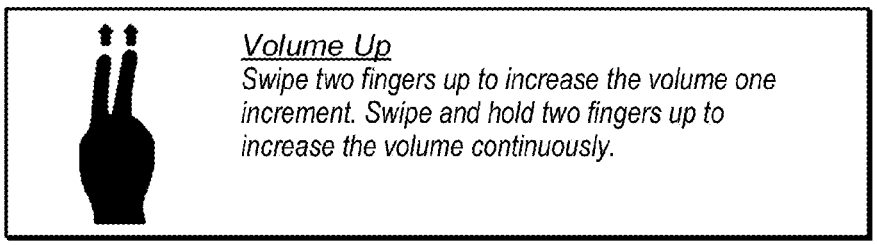
Figure 19G:
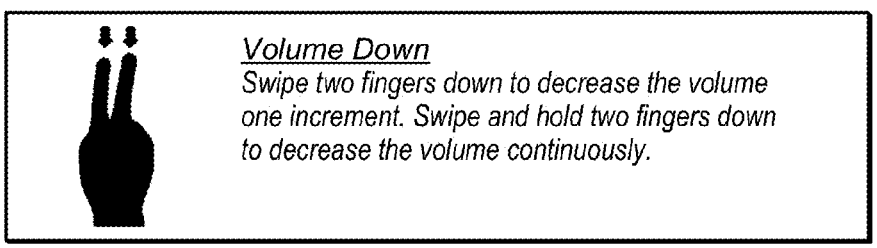
Figure 19H:
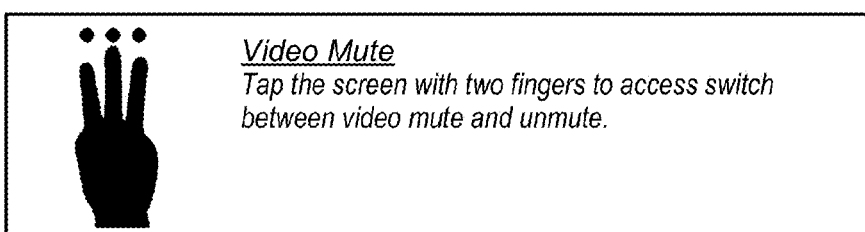
Figure 19I:
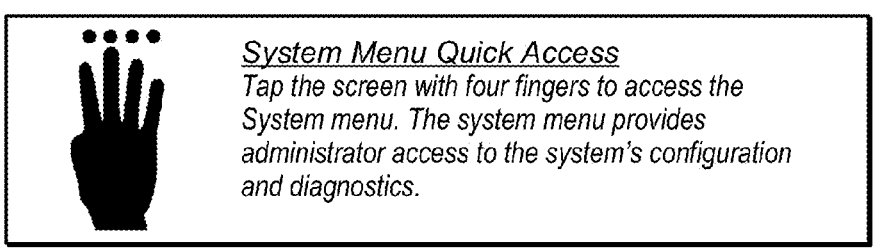

FIG. 19A-19I illustrate exemplary gestures (e.g., which may be shown in a help menu). More specifically, FIG. 19A describes selection by touching buttons or areas of a screen using a single finger; FIG. 19B describes horizontal scrolling by swiping a single finger left or right to scroll horizontally; FIG. 19C describes vertical scrolling by swiping a single finger up or down to scroll vertically; FIG. 19D shows various camera control gestures, such as panning left or right by moving a dragging a single finger left or right, tilting up or down by dragging a single finger up or down, zooming in or out by providing pinch or reverse pinch gestures, etc.; FIG. 19E describes a microphone mute by providing a two finger tap; FIGS. 19F and 19G describes a volume adjustment by dragging up or down with two fingers (e.g., where a swipe increases or decreases the volume by an increment, but a hold will increase the volume continuously); FIG. 19H describes a video mute using a three finger tap; and FIG. 19H describes a system menu quick access gesture by providing a four finger tap.

Figure 20A:
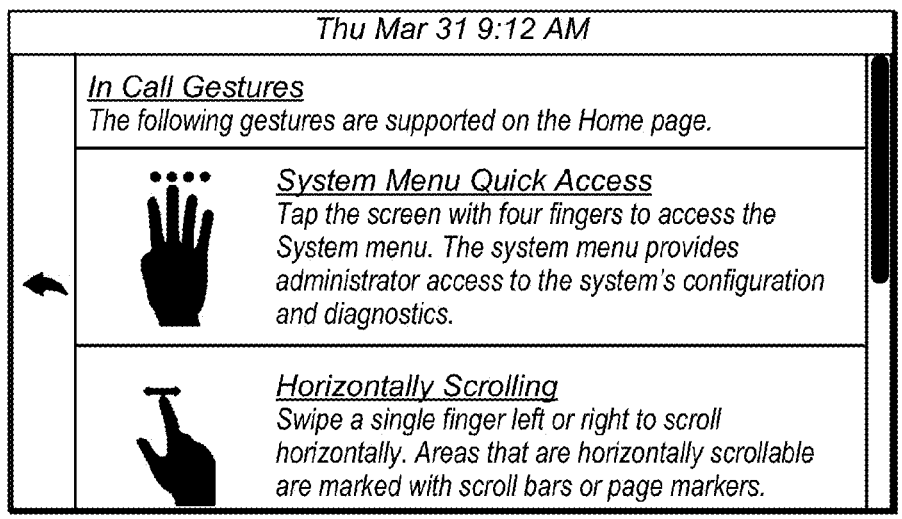
Figure 20B:
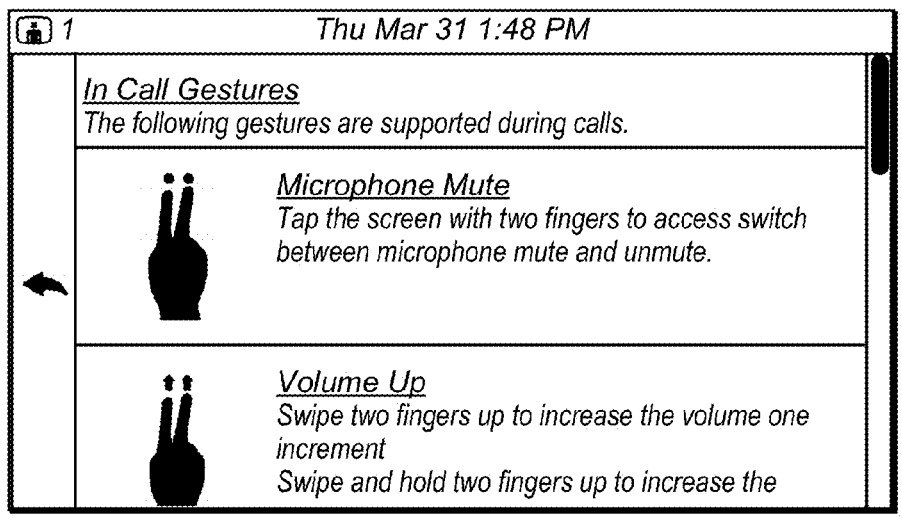
Figure 20C:
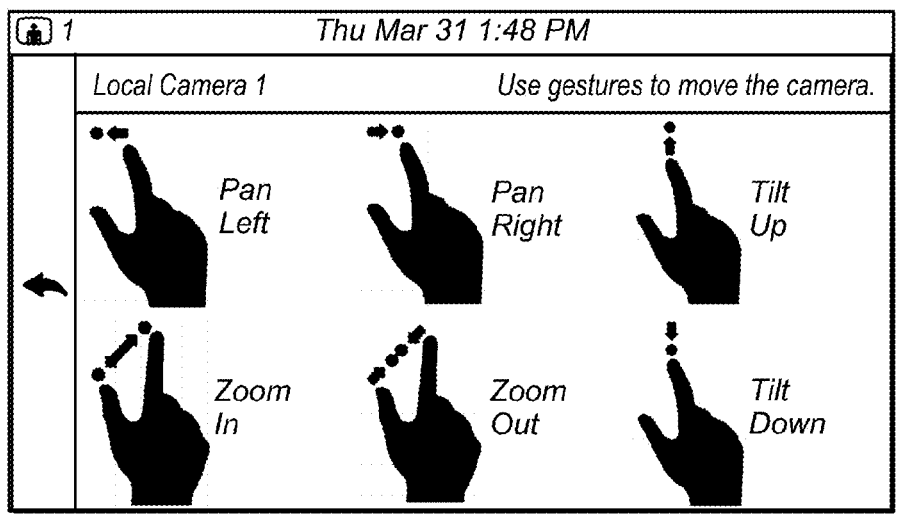

FIGS. 20A-20C are further exemplary interfaces corresponding to gestures. These Figures include the status bar and menu options to return to a previous screen. In FIG. 20A, the horizontal scrolling and system menu quick access gestures are described (although more gestures may be found below these two). As also shown, in the embodiment of FIG. 20A, these gestures may be supported by (e.g., and specific to) the home screen. For example, the gestures may not be valid or the same in other interfaces.

FIG. 20B illustrates in call gestures for microphone mute and volume up (with further gestures below), and finally, FIG. 20C illustrates an interface showing the camera control gestures described above.

Embodiments of a subset or all (and portions or all) of the above may be implemented by program instructions stored in a memory medium or carrier medium and executed by a processor.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A non-transitory, computer accessible memory medium comprising program instructions for muting a videoconference using a touch screen, wherein the program instructions are executable to:
    display on the touch screen a graphical user interface comprising one or more selectable options;
    receive user input to the touch screen during the videoconference, wherein the user input comprises a complex touch gesture to mute the videoconference, wherein the complex touch gesture is performed at least partially over the one or more selectable options of the graphical user interface, wherein the complex touch gesture does not select any of the one or more selectable options;
    mute the videoconference based on the complex touch gesture.

2. The non-transitory, computer accessible memory medium of claim 1, wherein the complex gesture corresponds to a video mute, wherein said muting the videoconference comprises video muting the videoconference.

3. The non-transitory, computer accessible memory medium of claim 2, wherein the user input is received at a first participant location, wherein video muting the videoconference comprises ceasing to provide video of participants at the first participant location.

4. The non-transitory, computer accessible memory medium of claim 2, wherein the complex gesture comprises a three touch tap gesture.

5. The non-transitory, computer accessible memory medium of claim 1, wherein the complex gesture corresponds to an audio mute, wherein said muting the videoconference comprises audio muting the videoconference.

6. The non-transitory, computer accessible memory medium of claim 5, wherein the user input is received at a first participant location, wherein audio muting the videoconference comprises ceasing to provide audio of participants at the first participant location.

7. The non-transitory, computer accessible memory medium of claim 5, wherein the complex gesture comprises a two touch tap gesture.

8. The non-transitory, computer accessible memory medium of claim 5, wherein the program instructions are further executable to:
    receive second user input to the touch screen during the videoconference, wherein the second user input comprises a second complex touch gesture to video mute a videoconference; and
    video mute the videoconference based on the second complex touch gesture.

9. The non-transitory, computer accessible memory medium of claim 1, wherein the user input is received at a first participant location, wherein said muting the videoconference comprises ceasing to provide audio and video of participants at the first participant location.

10. The non-transitory, computer accessible memory medium of claim 1, wherein the complex gesture comprises a multi-touch tap gesture.

11. A method for muting a videoconference using a touch screen, comprising:
    displaying on the touch screen a graphical user interface comprising one or more selectable options;

receiving user input to the touch screen during the videoconference, wherein the user input comprises a complex touch gesture to mute the videoconference, wherein the complex touch gesture is performed at least partially over the one or more selectable options of the graphical user interface, wherein the complex touch gesture does not select any of the one or more selectable options;

muting the videoconference based on the complex touch gesture.

12. The method of claim 11, wherein the complex gesture corresponds to a video mute, wherein said muting the videoconference comprises video muting the videoconference.

13. The method of claim 12, wherein the user input is received at a first participant location, wherein video muting the videoconference comprises ceasing to provide video of participants at the first participant location.

14. The method of claim 12, wherein the complex gesture comprises a three touch tap gesture.

15. The method of claim 11, wherein the complex gesture corresponds to an audio mute, wherein said muting the videoconference comprises audio muting the videoconference.

16. The method of claim 15, wherein the user input is received at a first participant location, wherein audio muting the videoconference comprises ceasing to provide audio of participants at the first participant location.

17. The method of claim 15, wherein the complex gesture comprises a two touch tap gesture.

18. The method of claim 15, further comprising:
receiving second user input to the touch screen during the videoconference, wherein the second user input comprises a second complex touch gesture to video mute a videoconference; and
video muting the videoconference based on the second complex touch gesture.

19. The method of claim 11, wherein the user input is received at a first participant location, wherein said muting the videoconference comprises ceasing to provide audio and video of participants at the first participant location.

20. The method of claim 11, wherein the complex gesture comprises a multi-touch tap gesture.

21. A videoconferencing system, comprising:
a videoconferencing unit at a participant location;
at least one display coupled to the videoconferencing unit, wherein the at least one display is configured to provide video corresponding to other participant locations during a videoconference;
at least one audio output coupled to the videoconferencing unit, wherein the at least one audio output is configured to provide audio corresponding to the other participant locations during the videoconference;
at least one video input coupled to the videoconferencing unit, wherein the at least one video input is configured to capture video of the participant location for provision to the other participant locations;
at least one audio input coupled to the videoconferencing unit, wherein the at least one audio input is configured to capture audio of the participant location for provision to the other participant locations; and
at least one touch interface coupled to the videoconferencing unit, wherein the at least one touch interface is configured to:
display a graphical user interface comprising one or more selectable options; and
receive a plurality of touch gestures to control the videoconference;
wherein, in response to a first complex touch gesture received to the at least one touch interface at least partially over the one or more selectable options of the graphical user interface, but without selecting any of the one or more selectable options, the videoconferencing unit is configured to mute the videoconference.

22. The videoconferencing system of claim 21, wherein the videoconferencing system further comprises a speaker phone, wherein a first touch interface of the at least one touch interface is comprised in the speaker phone.

23. The videoconferencing system of claim 22, wherein the first touch interface is removable from the speaker phone.

24. The videoconferencing system of claim 21, wherein said muting the videoconference comprises audio muting the videoconference.

25. The videoconferencing system of claim 21, wherein said muting the videoconference comprises video muting the videoconference.

* * * * *